United States Patent
Zhang et al.

(10) Patent No.: US 11,796,775 B2
(45) Date of Patent: Oct. 24, 2023

(54) ZOOM LENS ASSEMBLY

(71) Applicant: ZHEJIANG SUNNY OPTICS CO., LTD., Zhejiang (CN)

(72) Inventors: Qian Zhang, Zhejiang (CN); Yabin Hu, Zhejiang (CN); Fujian Dai, Zhejiang (CN); Liefeng Zhao, Zhejiang (CN)

(73) Assignee: ZHEJIANG SUNNY OPTICS CO., LTD., Ningbo (CN)

( * ) Notice: Subject to any disclaimer, the term of this patent is extended or adjusted under 35 U.S.C. 154(b) by 114 days.

(21) Appl. No.: 17/462,034

(22) Filed: Aug. 31, 2021

(65) Prior Publication Data
US 2022/0066184 A1 Mar. 3, 2022

(30) Foreign Application Priority Data
Aug. 31, 2020 (CN) .......................... 202010901506.5

(51) Int. Cl.
*G02B 15/14* (2006.01)
*G02B 5/00* (2006.01)
*G02B 13/00* (2006.01)
*G02B 5/20* (2006.01)

(52) U.S. Cl.
CPC ........... *G02B 15/144* (2019.08); *G02B 5/005* (2013.01); *G02B 13/004* (2013.01); *G02B 13/009* (2013.01); *G02B 15/144507* (2019.08); *G02B 15/144515* (2019.08); *G02B 5/20* (2013.01); *G02B 13/0055* (2013.01)

(58) Field of Classification Search
CPC ................ G02B 15/144507; G02B 15/144515
See application file for complete search history.

(56) References Cited

U.S. PATENT DOCUMENTS

| 2012/0033308 A1* | 2/2012 | Heu | ............... | G02B 15/144507 |
| | | | | 359/684 |
| 2012/0120501 A1* | 5/2012 | Katayose | ....... | G02B 15/143507 |
| | | | | 359/689 |

* cited by examiner

*Primary Examiner* — Darryl J Collins
(74) *Attorney, Agent, or Firm* — Gang Yu

(57) ABSTRACT

The disclosure provides a zoom lens assembly, which sequentially includes from an object side to an image side along an optical axis: a first lens group; a second lens group with a positive refractive power, spaced from the first lens group by a first air space and movable on the optical axis; a third lens group with a positive refractive power, spaced from the second lens group by a second air space and movable on the optical axis; and a fourth lens group, spaced from the third lens group by a third air space; wherein a Total Track Length (TTL) of the zoom lens assembly and a difference $\Delta f$ between an effective focal length of the zoom lens assembly at a wide end and an effective focal length of the zoom lens assembly at a tele end satisfy $2.5 < TTL/|\Delta f| < 4.0$.

14 Claims, 30 Drawing Sheets wide end middle end tele end longitudinal aberration curve lateral color curve longitudinal aberration curve wide end middle end tele end wide end middle end tele end wide end middle end tele end

ZOOM LENS ASSEMBLY

CROSS-REFERENCE TO RELATED PRESENT INVENTION(S)

The disclosure claims priority to and the benefit of Chinese Patent Present invention No. 202010901506.5, filed in the China National Intellectual Property Administration (CNIPA) on 31 Aug. 2020, which is incorporated herein by reference in its entirety.

TECHNICAL FIELD

The disclosure relates to the technical field of optical imaging devices, and particularly to a zoom lens assembly.

BACKGROUND

With the improvement of the lens manufacturing level, existing video camera has been applied more comprehensively and extensively. A zoom lens may zoom in a certain range to obtain different fields of view, images with different sizes, and different scenery scopes. A zooming solution of an existing mobile phone is implemented by switching multiple lenses with fixed focal lengths, and switching between these fixed focal lengths is completed by algorithm differences. Consequently, the definition loss of the lens during zooming is relatively great, and the pursuit of a user for high definition cannot be satisfied.

That is, there is such a problem in the related art that a lens is unstable in definition and difficult to miniaturize.

SUMMARY

A main objective of the disclosure is to provide a zoom lens assembly, to solve the problem in the related art that a lens is unstable in definition and difficult to miniaturize.

In order to achieve the objective, some embodiments of the disclosure provide a zoom lens assembly, which sequentially includes from an object side to an image side along an optical axis: a first lens group; a second lens group with a positive refractive power, spaced from the first lens group by a first air space and movable on the optical axis; a third lens group with a positive refractive power, spaced from the second lens group by a second air space and movable on the optical axis; and a fourth lens group, spaced from the third lens group by a third air space; wherein a Total Track Length (TTL) of the zoom lens assembly and a difference $\Delta f$ between an effective focal length of the zoom lens assembly at a wide end and an effective focal length of the zoom lens assembly at a tele end satisfy $2.5<TTL/|\Delta f|<4.0$.

In an implementation mode, the zoom lens assembly further includes a diaphragm, arranged between the first lens group and the second lens group and moving with the second lens group, and a numerical aperture Fno of the zoom lens assembly in different zoom states satisfies $2.8<Fno\leq55.0$.

In an implementation mode, the first air space, the second air space and the third air space are all greater than 0.5 millimeters.

In an implementation mode, an effective focal length fw of the zoom lens assembly at the wide end and an effective focal length fG2 of the second lens group satisfy $0.5<fw/fG2<1.0$.

In an implementation mode, an effective focal length fw of the zoom lens assembly at the wide end and an effective focal length fG3 of the third lens group satisfy $0<fw/fG3\leq1.0$.

In an implementation mode, an effective focal length fw of the zoom lens assembly at the wide end and an effective focal length fG4 of the fourth lens group satisfy $fw/|fG4|<1.5$.

In an implementation mode, the effective focal length ft of the zoom lens assembly at the tele end and a zoom movement distance $\Delta T1$ of the second lens group from the wide end to the tele end on the optical axis satisfy $2.0<ft/|\Delta T1|<3.0$; and/or In an implementation mode, the effective focal length ft of the zoom lens assembly at the tele end and a zoom movement distance $\Delta T3$ of the third lens group from the wide end to the tele end on the optical axis satisfy $5.0<ft/|\Delta T3|<6.0$.

In an implementation mode, the fourth lens group is movable on the optical axis, and moves for focusing with an object distance of the zoom lens assembly, and when the object distance changes from an infinite distance to 1.5 meters, a focusing movement distance $\Delta T4$ of the fourth lens group on the optical axis satisfies $|\Delta T4|<1.0$ mm.

In an implementation mode, the first lens group G1 includes a first lens; the second lens group includes a second lens, a third lens and a fourth lens, and at least one of the second lens, the third lens and the fourth lens has a positive refractive power; the third lens group includes a fifth lens and a sixth lens; and the fourth lens group includes a seventh lens and an eighth lens, and at least one of the seventh lens and the eighth lens has a positive refractive power.

In an implementation mode, an effective focal length f2 of the second lens and the effective focal length fG2 of the second lens group satisfy $-5.0<f2/fG2\leq-2.0$.

In an implementation mode, an effective focal length f5 of the fifth lens and an effective focal length f6 of the sixth lens satisfy $-3.0\leq f5/f6<-1.0$.

In an implementation mode, a curvature radius R9 of an object-side surface of the fifth lens, a curvature radius R10 of an image-side surface of the fifth lens and a center thickness CT5 of the fifth lens satisfy $1.0<(R9-R10)/CT5<5.0$.

In an implementation mode, a curvature radius R13 of an object-side surface of the seventh lens, a curvature radius R14 of an image-side surface of the seventh lens and a center thickness CT7 of the seventh lens satisfy $0<(R14-R13)/CT7<1.0$.

Some other embodiments of the disclosure provide a zoom lens assembly, which sequentially includes from an object side to an image side along an optical axis: a first lens group; a second lens group with a positive refractive power, spaced from the first lens group by a first air space and movable on the optical axis; a third lens group with a positive refractive power, spaced from the second lens group by a second air space and movable on the optical axis; and a fourth lens group, spaced from the third lens group by a third air space; wherein an effective focal length fw of the zoom lens assembly at a wide end and an effective focal length ft of the zoom lens assembly at a tele end satisfy $1.5<ft/fw<2.0$.

In an implementation mode, a Total Track Length (TTL) of the zoom lens assembly and a difference $\Delta f$ between the effective focal length of the zoom lens assembly at the wide end and the effective focal length of the zoom lens assembly at the tele end satisfy $2.5<TTL/|\Delta f|<4.0$.

In an implementation mode, the zoom lens assembly further includes a diaphragm, arranged between the first lens group and the second lens group and moving with the second lens group, and a numerical aperture Fno of the zoom lens assembly in different zoom states satisfies $2.8<Fno\leq5.0$.

In an implementation mode, the first air space, the second air space and the third air space are all greater than 0.5 millimeters.

In an implementation mode, the effective focal length fw of the zoom lens assembly at the wide end and an effective focal length fG2 of the second lens group satisfy $0.5 < fw/fG2 < 1.0$.

In an implementation mode, the effective focal length fw of the zoom lens assembly at the wide end and an effective focal length fG3 of the third lens group satisfy $0 < fw/fG3 \leq 1.0$.

In an implementation mode, the effective focal length fw of the zoom lens assembly at the wide end and an effective focal length fG4 of the fourth lens group satisfy $fw/|fG4| < 1.5$.

In an implementation mode, the effective focal length ft of the zoom lens assembly at the tele end and a zoom movement distance $\Delta T1$ of the second lens group from the wide end to the tele end on the optical axis satisfy $2.0 < ft/|\Delta T1| < 3.0$.

In an implementation mode, the effective focal length ft of the zoom lens assembly at the tele end and a zoom movement distance $\Delta T3$ of the third lens group from the wide end to the tele end on the optical axis satisfy $5.0 < ft/|\Delta T3| < 6.0$.

In an implementation mode, the fourth lens group is movable on the optical axis, and moves for focusing with an object distance of the zoom lens assembly, and when the object distance changes from an infinite distance to 1.5 meters, a focusing movement distance $\Delta T4$ of the fourth lens group on the optical axis satisfies $|\Delta T4| < 1.0$ mm.

In an implementation mode, the first lens group G1 includes a first lens; the second lens group includes a second lens, a third lens and a fourth lens, and at least one of the second lens, the third lens and the fourth lens has a positive refractive power; the third lens group includes a fifth lens and a sixth lens; and the fourth lens group includes a seventh lens and an eighth lens, and at least one of the seventh lens and the eighth lens has a positive refractive power.

In an implementation mode, an effective focal length f2 of the second lens and the effective focal length fG2 of the second lens group satisfy $-5.0 < f2/fG2 \leq -2.0$.

In an implementation mode, an effective focal length f5 of the fifth lens and an effective focal length f6 of the sixth lens satisfy $-3.0 \leq f5/f6 < -1.0$.

In an implementation mode, a curvature radius R9 of an object-side surface of the fifth lens, a curvature radius R10 of an image-side surface of the fifth lens and a center thickness CT5 of the fifth lens satisfy $1.0 < (R9-R10)/CT5 < 5.0$.

In an implementation mode, a curvature radius R13 of an object-side surface of the seventh lens, a curvature radius R14 of an image-side surface of the seventh lens and a center thickness CT7 of the seventh lens satisfy $0 < (R14-R13)/CT7 < 1.0$.

With the adoption of the technical solutions of the disclosure, the zoom lens assembly sequentially includes from the object side to the image side along the optical axis: the first lens group; the second lens group with the positive refractive power, spaced from the first lens group by the first air space and movable on the optical axis; the third lens group with the positive refractive power, spaced from the second lens group by the second air space and movable on the optical axis; and the fourth lens group, spaced from the third lens group by the third air space; wherein the Total Track Length (TTL) of the zoom lens assembly and the difference $\Delta f$ between the effective focal length of the zoom lens assembly at the wide end and the effective focal length of the zoom lens assembly at the tele end satisfy $2.5 < TTL/|\Delta f| < 4.0$.

The refractive power is configured reasonably, so that astigmatism and a distortion may be reduced effectively, and the imaging quality of the zoom lens assembly may be improved greatly. The second lens group is movable on the optical axis, and such a setting ensures that the second lens group may linearly move from the image side to the object side and a lateral magnification of the zoom lens assembly may be changed in a movement process. The third lens group is movable on the optical axis, and such a setting ensures that the third lens group may linearly move from the object side to the image side and rays emitted from the second lens group may be refocused on an image surface in a movement process. The two lens groups move together, so that a focal length of the zoom lens assembly may be continuously changed from the wide end to the tele end to ensure both a relatively high definition of the zoom lens assembly at each focus position and the miniaturization of the zoom lens assembly.

BRIEF DESCRIPTION OF THE DRAWINGS

The drawings forming a part of the disclosure in the specification are adopted to provide a further understanding to the disclosure. Schematic embodiments of the disclosure and descriptions thereof are adopted to explain the disclosure and not intended to form improper limits to the disclosure. In the drawings.

Figure 1:
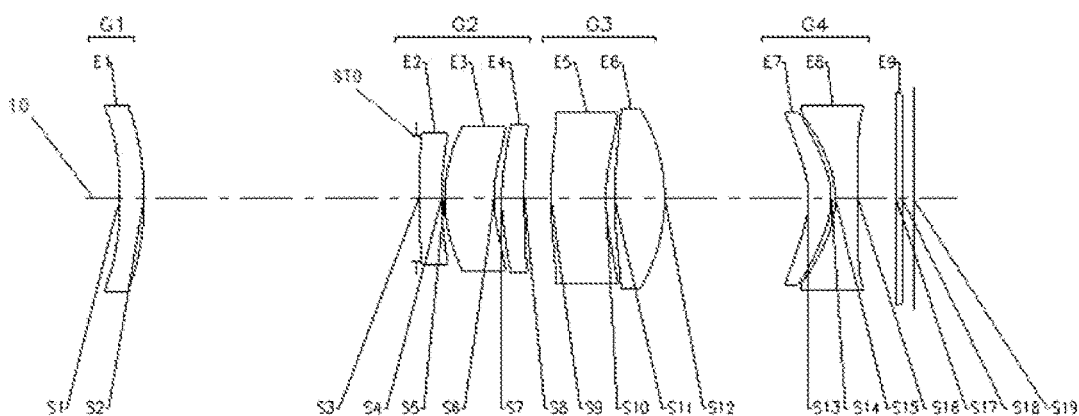
FIG. 1 shows a structural schematic diagram of a wide end of a zoom lens assembly according to Example 1 of the disclosure.

The drawings include the following reference signs:

10: an optical axis; G1: a first lens group; E1: a first lens; S1: an object-side surface of the first lens; S2: an image-side surface of the first lens; STO: a diaphragm; G2: a second lens group; E2: a second lens; S3: an object-side surface of the second lens; S4: an image-side surface of the second lens; E3: a third lens; S5: an object-side surface of the third lens; S6: an image-side surface of the third lens; E4: a fourth lens; S7: an object-side surface of the fourth lens; S8: an image-side surface of the fourth lens; G3: a third lens group; E5: a fifth lens; S9: an object-side surface of the fifth lens; S10: an image-side surface of the fifth lens; E6: a sixth lens; S11: an object-side surface of the sixth lens; S12: an image-side surface of the sixth lens; G4: a fourth lens group; E7: a seventh lens; S13: an object-side surface of the seventh lens; S14: an image-side surface of the seventh lens; E8: an eighth lens; S15: an object-side surface of the eighth lens; S16: an image-side surface of the eighth lens; E9: an optical filter; S17: an object-side surface of the optical filter; S18: an image-side surface of the optical filter; and S19: an imaging surface.

DETAILED DESCRIPTION OF THE EMBODIMENTS

It is to be noted that the embodiments in the disclosure and characteristics in the embodiments may be combined without conflicts. The disclosure will be described below with reference to the drawings and in combination with the embodiments in detail.

It is to be pointed out that, unless otherwise specified, all technical and scientific terms used in the disclosure have the same meanings as commonly understood by those of ordinary skill in the art of the disclosure.

In the disclosure, unless conversely specified, the used orientation terms "upper, lower, top, and bottom" are usually for the directions shown in the drawings, or for a component in a vertical, perpendicular, or gravity direction. Similarly, for convenient understanding and description, "inner and outer" refer to inner and outer relative to a contour of each component. However, these orientation terms are not intended to limit the disclosure.

It should be noted that, in this description, the expressions of first, second, third, and the like are only used to distinguish one feature from another feature, and do not represent any limitation to the feature. Thus, a first lens discussed below could also be referred to as a second lens or a third lens without departing from the teachings of the disclosure.

In the drawings, the thickness, size and shape of the lens have been slightly exaggerated for ease illustration. In particular, a spherical shape or aspheric shape shown in the drawings is shown by some embodiments. That is, the spherical shape or the aspheric shape is not limited to the spherical shape or aspheric shape shown in the drawings. The drawings are by way of example only and not strictly to scale.

Herein, a paraxial region refers to a region nearby an optical axis. If a lens surface is a convex surface and a position of the convex surface is not defined, it indicates that the lens surface is a convex surface at least in the paraxial region; and if a lens surface is a concave surface and a position of the concave surface is not defined, it indicates that the lens surface is a concave surface at least in the paraxial region. A surface, close to an object side, of each lens is called an object-side surface of the lens, and a surface, close to an image side, of each lens is called an image-side surface of the lens. A surface type of the paraxial region may be judged according to a judgment manner known to those of ordinary skill in the art, and whether a surface is concave or convex is judged according to whether an R value is positive or negative (R refers to a curvature radius of the paraxial region, usually refers to an R value on lens data in optical software). For example, an object-side surface is determined as a convex surface if the R value is positive, and is determined as a concave surface if the R value is negative. An image-side surface is determined as a concave surface if the R value is positive, and is determined as a convex surface is the R value is negative.

In order to solve the problem in the related art that a lens is unstable in definition and difficult to miniaturize, the disclosure provides a zoom lens assembly.

Embodiment 1

Figure 60:
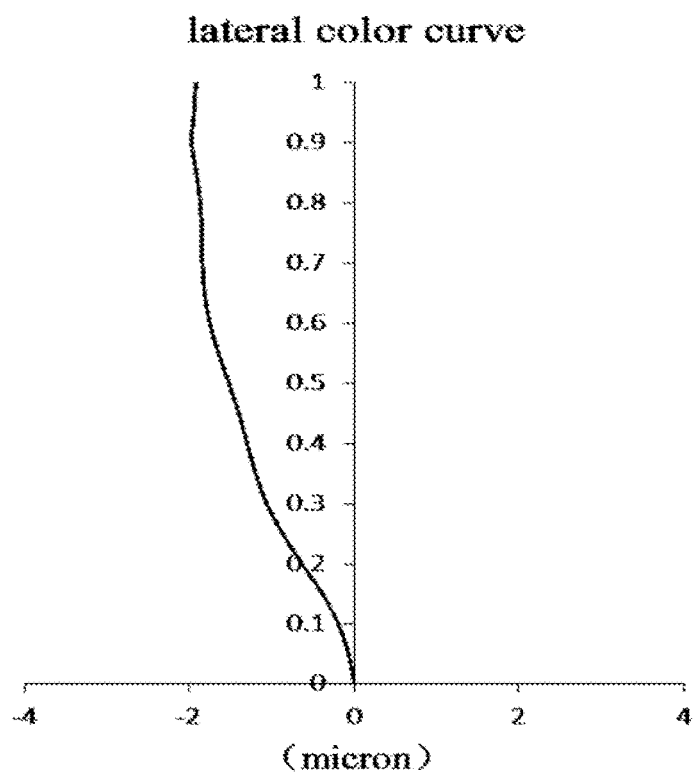

As shown in FIGS. 1-60, a zoom lens assembly sequentially includes from an object side to an image side along an optical axis 10: a first lens group G1, a second lens group G2 with a positive refractive power, a third lens group G3 with a positive refractive power, and a fourth lens group G4. The second lens group G2 is spaced from the first lens group G1 by a first air space, and is movable on the optical axis 10. The third lens group G3 is spaced from the second lens group G2 by a second air space, and is movable on the optical axis 10. The fourth lens group G4 is spaced from the third lens group G3 by a third air space. A Total Track Length (TTL) of the zoom lens assembly and a difference Δf between an effective focal length of the zoom lens assembly at a wide end and an effective focal length of the zoom lens assembly at a tele end satisfy $2.5<TTL/|\Delta f|<4.0$. More specifically, the TTL of the zoom lens assembly and the difference $\Delta f$ between the effective focal length of the zoom lens assembly at the wide end and the effective focal length of the zoom lens assembly at the tele end may satisfy $3.0<TTL/|\Delta f|<3.6$.

The refractive power is configured reasonably, so that an astigmatism and a distortion may be reduced effectively, and the imaging quality of the zoom lens assembly may be improved greatly. The second lens group G2 is movable on the optical axis 10, and such a setting ensures that the second lens group G2 may linearly move from the image side to the object side and a lateral magnification of the zoom lens assembly may be changed in a movement process. The third lens group G3 is movable on the optical axis 10, and such a setting ensures that the third lens group G3 may linearly move from the object side to the image side and rays emitted from the second lens group may be refocused on an image surface in a movement process. The two lens groups move together, so that a focal length of the zoom lens assembly may be continuously changed from the wide end to the tele end to ensure both a relatively high definition of the zoom lens assembly at each focus position and the miniaturization of the zoom lens assembly.

In the embodiment, the zoom lens assembly further includes a diaphragm STO, arranged between the first lens group G1 and the second lens group G2 and moving with the second lens group G2, and a numerical aperture Fno of the zoom lens assembly in different zoom states satisfies $2.8<Fno\leq5.0$. By such a setting, the diaphragm STO moves together with the second lens group G2, which is favorable for control the Fno in each focal length in a relatively small range and ensures the imaging quality of the zoom lens assembly. The diaphragm STO is fixed in front of the second lens group G2, and such a setting is favorable for the miniaturization of the zoom lens assembly.

In the embodiment, the first air space, the second air space and the third air space are all greater than 0.5 millimeters. By such a setting, a minimum distance between each lens group is kept greater than 0.5 millimeters, so that each lens group may be effectively prevented from collisions during movement or separation, and the structural stability is ensured.

In the embodiment, an effective focal length fw of the zoom lens assembly at the wide end and an effective focal length fG2 of the second lens group satisfy $0.5<fw/fG2<1.0$. More specifically, the effective focal length fw of the zoom lens assembly at the wide end and the effective focal length fG2 of the second lens group may satisfy $0.5<fw/fG2<0.9$. A ratio of the effective focal length of the second lens group to the effective focal length at the wide end is controlled reasonably to help to reasonably configure the refractive power at the wide end and optimize shapes of lenses, thereby inhibiting the generation of wide-angle distortions.

In the embodiment, the effective focal length fw of the zoom lens assembly at the wide end and an effective focal length fG3 of the third lens group satisfy $0<fw/fG3\leq1.0$. More specifically, the effective focal length fw of the zoom lens assembly at the wide end and the effective focal length fG3 of the third lens group may satisfy $0.6<fw/fG3\leq1.0$. A ratio of the effective focal length fG3 of the third lens group to the effective focal length at the wide end may be controlled to ensure that the third lens group G3 may be matched with the second lens group G2 better to compensate the movement of a focal plane after the movement of the second lens group G2 and further inhibit an on-axis ray aberration.

In the embodiment, the effective focal length fw of the zoom lens assembly at the wide end and an effective focal length fG4 of the fourth lens group satisfy $fw/|fG4|<1.5$. More specifically, the effective focal length fw of the zoom lens assembly at the wide end and the effective focal length fG4 of the fourth lens group may satisfy $-1.5<fw/fG4<0.5$. The refractive power of the fourth lens group G4 may be configured reasonably to effectively control an aberration contribution of the fourth lens group G4 and balance an aberration generated by the previous group at each focus position to control an overall aberration of the zoom lens assembly in a reasonable range and further ensure high imaging quality of the zoom lens assembly.

In the embodiment, an effective focal length ft of the zoom lens assembly at the tele end and a zoom movement distance $\Delta T1$ of the second lens group G2 from the wide end to the tele end on the optical axis 10 satisfy $2.0<ft/|\Delta T1|<3.0$. More specifically, the effective focal length ft of the zoom lens assembly at the tele end and the zoom movement distance $\Delta T1$ of the second lens group G2 from the wide end to the tele end on the optical axis 10 may satisfy $2.5<ft/|\Delta T1|<2.6$. The zoom movement distance of the second lens group G2 from the wide end to the tele end on the optical axis 10 is controlled to ensure a zooming range of the zoom lens assembly to facilitate zooming in a large range from the wide end to the tele end and improve the applicability of the zoom lens assembly.

In the embodiment, the effective focal length ft of the zoom lens assembly at the tele end and a zoom movement distance $\Delta T3$ of the third lens group G3 from the wide end to the tele end on the optical axis 10 satisfy $5.0<ft/|\Delta T3|<6.0$. More specifically, the effective focal length ft of the zoom lens assembly at the tele end and the zoom movement distance $\Delta T3$ of the third lens group G3 from the wide end to the tele end on the optical axis 10 may satisfy $5.1<ft/|T3|<5.7$. The zoom movement distance of the third lens group G3 is controlled in a relatively small range to ensure the imaging quality of the zoom lens assembly, simultaneously reduce the stroke of a motor and reduce difficulties in machining.

In the embodiment, the fourth lens group G4 is movable on the optical axis 10, and moves for focusing with an object distance of the zoom lens assembly, and when the object distance changes from an infinite distance to 1.5 meters, a focusing movement distance $\Delta T4$ of the fourth lens group G4 on the optical axis 10 satisfies $|\Delta T4|<1.0$ mm. By such a setting, the fourth lens group G4 may be driven by the motor to move on the optical axis 10 to adjust the position of the focal plane when the object distance changes, thereby implementing focusing. The focusing movement distance $\Delta T4$ of the fourth lens group G4 on the optical axis 10 may be controlled to reduce the requirement on the stroke of the motor, rapidly respond to the focusing of the zoom lens assembly and improve a using effect for a user.

In the embodiment, the first lens group G1 includes a first lens E1; the second lens group G2 includes a second lens E2, a third lens E3 and a fourth lens E4, and at least one of the second lens E2, the third lens E3 and the fourth lens E4 has a positive refractive power; the third lens group G3 includes a fifth lens E5 and a sixth lens E6; and the fourth lens group G4 includes a seventh lens E7 and an eighth lens E8, and at least one of the seventh lens E7 and the eighth lens E8 has a positive refractive power. By such a setting, the first lens group G1 restricts the aperture of the zoom lens assembly. The first lens group G1 is fixed to help to control the aperture of the zoom lens assembly. The setting of the three lenses is favorable for the reasonable configuration of the refractive power, and ensures that the second lens group G2 plays a role in changing the lateral magnification. Moreover, positive and negative lenses are combined to help to control the spherical aberration and the coma. Each of the third lens group G3 and the fourth lens group G4 uses two lenses, and such a setting is favorable for reasonably configuring the refractive power to further reduce the aberration.

In the embodiment, an effective focal length f2 of the second lens and the effective focal length fG2 of the second lens group G2 satisfy −5.0<f2/fG2≤−2.0. More specifically, the effective focal length f2 of the second lens and the effective focal length fG2 of the second lens group G2 may satisfy −3.8<f2/fG2≤−2.0. The positive and negative lenses in the second lens group G2 are combined to help to control an aberration of the second lens group G2 to ensure that an aberration contribution of the second lens group G2 changes in a relatively small range no matter where it moves, which is favorable for correcting aberrations of the other lens groups. A ratio of the effective focal length f2 of the second lens to the effective focal length fG2 of the second lens group is controlled to help to reasonably configure the refractive power in the second lens group G2, ensure the reasonable shaping of each lens in the second lens group G2 and make it convenient to machine the lenses.

In the embodiment, an effective focal length f5 of the fifth lens and an effective focal length f6 of the sixth lens satisfy −3.0≤f5/f6<−1.0. More specifically, the effective focal length f5 of the fifth lens and the effective focal length f6 of the sixth lens may satisfy −3.0≤f5/f6<−1.3. The reasonable configuration of the refractive power in the third lens group G3 is controlled to effectively inhibit an aberration contribution of the third lens group G3 and further improve the on-axis imaging quality.

In the embodiment, a curvature radius R9 of an object-side surface of the fifth lens, a curvature radius R10 of an image-side surface of the fifth lens and a center thickness CT5 of the fifth lens satisfy 1.0<(R9−R10)/CT5<5.0. More specifically, the curvature radius R9 of the object-side surface of the fifth lens, the curvature radius R10 of the image-side surface of the fifth lens and the center thickness CT5 of the fifth lens may satisfy 1.3<(R9−R10)/CT5<3.5. Such a setting may effectively restrict the shape of the fifth lens E5 to further inhibit aberration contribution rates of the object-side surface S9 of the fifth lens and the image-side surface S10 of the fifth lens and effectively balance an aperture band related aberration of the system to further improve the imaging quality of the zoom lens assembly.

In the embodiment, a curvature radius R13 of an object-side surface of the seventh lens, a curvature radius R14 of an image-side surface of the seventh lens and a center thickness CT7 of the seventh lens satisfy 0<(R14−R13)/CT7<1.0. More specifically, the curvature radius R13 of the object-side surface of the seventh lens, the curvature radius R14 of the image-side surface of the seventh lens and the center thickness CT7 of the seventh lens may satisfy 0.4<(R14−R13)/CT7<0.9. Such a setting may effectively control the shape of the seventh lens E7 and reduce difficulties in machining.

Embodiment 2

The disclosure provides a zoom lens assembly, which sequentially includes from an object side to an image side along an optical axis 10: a first lens group G1, a second lens group G2 with a positive refractive power, a third lens group G3 with a positive refractive power and a fourth lens group G4. The second lens group G2 is spaced from the first lens group G1 by a first air space, and is movable on the optical axis 10. The third lens group G3 is spaced from the second lens group G2 by a second air space, and is movable on the optical axis 10. The fourth lens group G4 is spaced from the third lens group G3 by a third air space. An effective focal length fw of the zoom lens assembly at a wide end and an effective focal length ft of the zoom lens assembly at a tele end satisfy 1.5<ft/fw<2.0.

The refractive power is configured reasonably, so that astigmatism and a distortion may be reduced effectively, and the imaging quality of the zoom lens assembly may be improved greatly. The second lens group G2 is movable on the optical axis 10, and such a setting ensures that the second lens group G2 may linearly move from the image side to the object side and a lateral magnification of the zoom lens assembly may be changed in a movement process. The third lens group G3 is movable on the optical axis 10, and such a setting ensures that the third lens group G3 may linearly move from the object side to the image side and rays emitted from the second lens group may be refocused on an image surface in a movement process. The two lens groups move together, so that a focal length of the zoom lens assembly may be continuously changed from the wide end to the tele end to ensure both a relatively high definition of the zoom lens assembly at each focus position and the miniaturization of the zoom lens assembly. A ratio of the effective focal length fw of the zoom lens assembly at the wide end to the effective focal length ft of the zoom lens assembly at the tele end is controlled to ensure relatively high imaging quality at the same time of ensuring that the zoom lens assembly may zoom in a large range to improve the applicability of the zoom lens assembly.

In the embodiment, a Total Track Length (TTL) of the zoom lens assembly and a difference Δf between the effective focal length of the zoom lens assembly at the wide end and the effective focal length of the zoom lens assembly at the tele end satisfy 2.5<TTL/|Δf|<4.0.

In the embodiment, the zoom lens assembly further includes a diaphragm STO, arranged between the first lens group G1 and the second lens group G2 and moving with the second lens group G2, and a numerical aperture Fno of the zoom lens assembly in different zoom states satisfies 2.8<Fno≤5.0.

In the embodiment, the first air space, the second air space and the third air space are all greater than 0.5 millimeters. By such a setting, a minimum distance between each lens group is kept greater than 0.5 millimeters, so that each lens group may be effectively prevented from collisions during movement or separation, and the structural stability is ensured.

In the embodiment, the effective focal length fw of the zoom lens assembly at the wide end and an effective focal length fG2 of the second lens group satisfy 0.5<fw/fG2<1.0. More specifically, the effective focal length fw of the zoom lens assembly at the wide end and the effective focal length fG2 of the second lens group may satisfy 0.5<fw/fG2<0.9. A ratio of the effective focal length of the second lens group to the effective focal length at the wide end is controlled reasonably to help to reasonably configure the refractive power at the wide end and optimize shapes of lenses, thereby inhibiting the generation of wide-angle distortions.

In the embodiment, the effective focal length fw of the zoom lens assembly at the wide end and an effective focal length fG3 of the third lens group satisfy 0<fw/fG3≤1.0. More specifically, the effective focal length fw of the zoom lens assembly at the wide end and the effective focal length fG3 of the third lens group may satisfy 0.6<fw/fG3≤1.0. A ratio of the effective focal length of the third lens group to the effective focal length at the wide end may be controlled to ensure better matching with the second lens group G2 to compensate the movement of a focal plane after the movement of the second lens group G2 and further inhibit an on-axis ray aberration.

In the embodiment, the effective focal length fw of the zoom lens assembly at the wide end and an effective focal length fG4 of the fourth lens group satisfy fw/|fG4|<1.5. More specifically, the effective focal length fw of the zoom lens assembly at the wide end and the effective focal length fG4 of the fourth lens group may satisfy −1.5<fw/fG4<0.5. The refractive power of the fourth lens group G4 may be configured reasonably to effectively control an aberration contribution of the fourth lens group G4 and balance an aberration generated by the third lens group G3 at each focus position to control an overall aberration of the zoom lens assembly in a reasonable range and further ensure high imaging quality of the zoom lens assembly.

In the embodiment, the effective focal length ft of the zoom lens assembly at the tele end and a zoom movement distance ΔT1 of the second lens group G2 from the wide end to the tele end on the optical axis 10 satisfy 2.0<ft/|ΔT1|<3.0. More specifically, the effective focal length ft of the zoom lens assembly at the tele end and the zoom movement distance ΔT1 of the second lens group G2 from the wide end to the tele end on the optical axis 10 may satisfy 2.5<ft/|ΔT1|<2.6. The zoom movement distance of the second lens group G2 from the wide end to the tele end on the optical axis 10 is controlled to ensure a zooming range of the zoom lens assembly to facilitate zooming in a large range from the wide end to the tele end and improve the applicability of the zoom lens assembly.

In the embodiment, the effective focal length ft of the zoom lens assembly at the tele end and a zoom movement distance ΔT3 of the third lens group G3 from the wide end to the tele end on the optical axis 10 satisfy 5.0<ft/|ΔT3|<6.0. More specifically, the effective focal length ft of the zoom lens assembly at the tele end and the zoom movement distance ΔT3 of the third lens group G3 from the wide end to the tele end on the optical axis 10 may satisfy 5.1<ft/|ΔT3|<5.7. The zoom movement distance of the third lens group G3 is controlled in a relatively small range to ensure the imaging quality of the zoom lens assembly, simultaneously reduce the stroke of a motor and reduce difficulties in machining.

In the embodiment, the fourth lens group G4 is movable on the optical axis 10, and moves for focusing with an object distance of the zoom lens assembly, and when the object distance changes from an infinite distance to 1.5 meters, a focusing movement distance ΔT4 of the fourth lens group G4 on the optical axis 10 satisfies |ΔT4|<1.0 mm. By such a setting, the fourth lens group G4 may be driven by the motor to move on the optical axis 10 to adjust the position of the focal plane when the object distance changes, thereby implementing focusing. The focusing movement distance ΔT4 of the fourth lens group G4 on the optical axis 10 may be controlled to reduce the requirement on the stroke of the motor, rapidly respond to the focusing of the zoom lens assembly and improve a using effect for a user.

In the embodiment, the first lens group G1 includes a first lens E1; the second lens group G2 includes a second lens E2, a third lens E3 and a fourth lens E4, and at least one of the second lens E2, the third lens E3 and the fourth lens E4 has a positive refractive power; the third lens group G3 includes a fifth lens E5 and a sixth lens E6; and the fourth lens group G4 includes a seventh lens E7 and an eighth lens E8, and at least one of the seventh lens E7 and the eighth lens E8 has a positive refractive power. By such a setting, the first lens group G1 restricts the aperture of the zoom lens assembly. The first lens group G1 is fixed to help to control the aperture of the zoom lens assembly. The setting of the three lenses is favorable for the reasonable configuration of the refractive power, and ensures that the second lens group G2 plays a role in changing the lateral magnification. Moreover, positive and negative lenses are combined to help to control the spherical aberration and the coma. Each of the third lens group G3 and the fourth lens group G4 uses two lenses, and such a setting is favorable for reasonably configuring the refractive power to further reduce the aberration.

In the embodiment, an effective focal length f2 of the second lens and the effective focal length fG2 of the second lens group satisfy −5.0<f2/fG2≤−2.0. More specifically, the effective focal length f2 of the second lens and the effective focal length fG2 of the second lens group may satisfy −3.8<f2/fG2≤−2.0. The positive and negative lenses in the second lens group G2 are combined to help to control an aberration of the second lens group G2 to ensure that an aberration contribution of the second lens group G2 changes in a relatively small range no matter where it moves, which is favorable for correcting aberrations of the other lens groups. A ratio of the effective focal length f2 of the second lens to the effective focal length fG2 of the second lens group is controlled to help to reasonably configure the refractive power in the second lens group G2, ensure the reasonable shaping of each lens in the second lens group G2 and make it convenient to machine the lenses.

In the embodiment, an effective focal length f5 of the fifth lens and an effective focal length f6 of the sixth lens satisfy −3.0≤f5/f6<−1.0. More specifically, the effective focal length f5 of the fifth lens and the effective focal length f6 of the sixth lens may satisfy −3.0≤f5/f6<−1.3. The reasonable configuration of the refractive power in the third lens group G3 is controlled to effectively inhibit an aberration contribution of the third lens group G3 and further improve the on-axis imaging quality.

In the embodiment, a curvature radius R9 of an object-side surface of the fifth lens, a curvature radius R10 of an image-side surface of the fifth lens and a center thickness CT5 of the fifth lens satisfy 1.0<(R9−R10)/CT5<5.0. More specifically, the curvature radius R9 of the object-side surface of the fifth lens, the curvature radius R10 of the image-side surface of the fifth lens and the center thickness CT5 of the fifth lens may satisfy 1.3<(R9−R10)/CT5<3.5. Such a setting may effectively restrict the shape of the fifth lens to further inhibit aberration contribution rates of the object-side surface S9 of the fifth lens and the image-side surface S10 of the fifth lens and effectively balance an aperture band related aberration of the system to further improve the imaging quality of the zoom lens assembly.

In the embodiment, a curvature radius R13 of an object-side surface of the seventh lens, a curvature radius R14 of an image-side surface of the seventh lens and a center thickness CT7 of the seventh lens satisfy 0<(R14−R13)/CT7<1.0. More specifically, the curvature radius R13 of the object-side surface of the seventh lens, the curvature radius R14 of the image-side surface of the seventh lens and the center thickness CT7 of the seventh lens may satisfy 0.4<(R14−R13)/CT7<0.9. Such a setting may effectively control the shape of the seventh lens E7 and reduce difficulties in machining.

The zoom lens assembly may further include at least one diaphragm STO, to improve the imaging quality of the lens. Optionally, the diaphragm STO may be arranged between the first lens group G1 and the second lens group G2.

Optionally, the zoom lens assembly may further include an optical filter configured to correct a chromatic aberration and/or a protective glass configured to protect a photosensitive element on the imaging surface.

The zoom lens assembly in the disclosure may adopt multiple lenses, for example, the abovementioned eight. The refractive power and surface types of each lens, the center thickness of each lens, on-axis distances between the lenses and the like may be reasonably configured to effectively enlarge an aperture of the zoom lens assembly, reduce the sensitivity of the lens, improve the machinability of the lens, and ensure that the lens is more favorable for production and machining and applicable to a portable electronic device. The zoom lens assembly also has a large aperture. may satisfy a miniaturization requirement of an intelligent electronic product.

In the disclosure, at least one of mirror surfaces of the lenses is an aspheric mirror surface. An aspheric lens has a characteristic that a curvature keeps changing from a center of the lens to a periphery of the lens. Unlike a spherical lens with a constant curvature from a center of the lens to a periphery of the lens, the aspheric lens has a better curvature radius characteristic and the advantages of improving distortions and improving astigmatism aberrations. With the adoption of the aspheric lens, aberrations during imaging may be eliminated as much as possible, thereby improving the imaging quality.

However, those skilled in the art should know that the number of the lenses forming the optical imaging lens assembly may be changed without departing from the technical solutions claimed in the disclosure to achieve each result and advantage described in the specification. For example, although descriptions are made in the implementation with eight lenses as an example, the optical imaging lens assembly is not limited to eight lenses. If necessary, the optical imaging lens assembly may further include another number of lenses.

Examples of specific surface types and parameters applied to the zoom lens assembly of the abovementioned implementation mode will further be described below with reference to the drawings.

It is to be noted that any one of following Example 1 to Example 4 is applied to all embodiments of the disclosure.

Example 1

Figure 2:
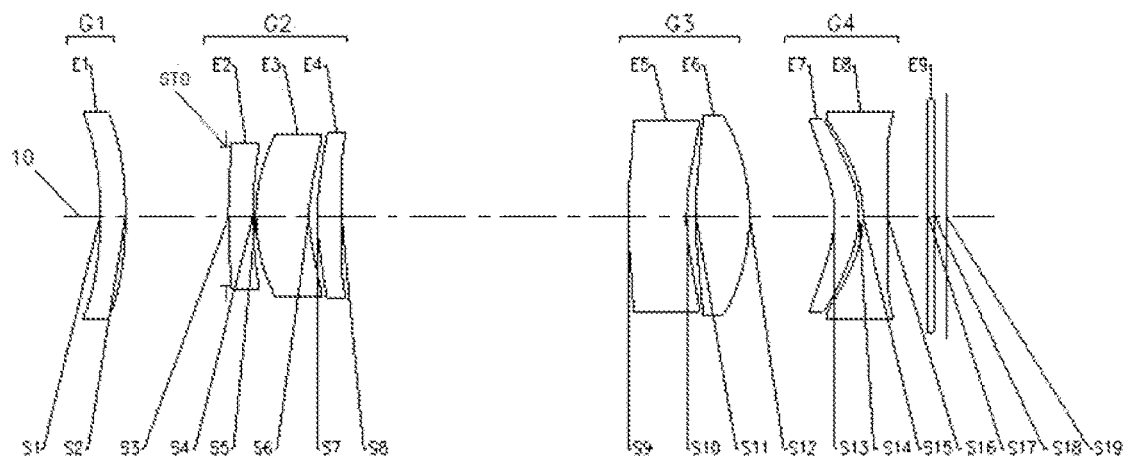
FIG. 2 shows a structural schematic diagram of a middle end of a zoom lens assembly according to Example 1 of the disclosure.
Figure 3:
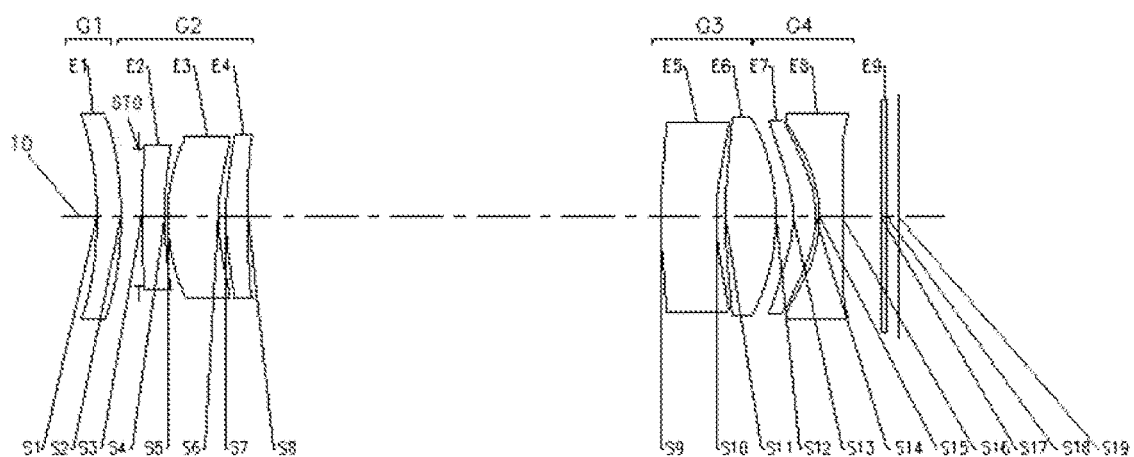
FIG. 3 shows a structural schematic diagram of a tele end of a zoom lens assembly according to Example 1 of the disclosure.

As shown in FIGS. 1-15, a zoom lens assembly according to Example 1 of the disclosure is described. FIG. 1 shows a structural schematic diagram of a wide end of a zoom lens assembly according to Example 1. FIG. 2 shows a structural schematic diagram of a middle end of a zoom lens assembly according to Example 1. FIG. 3 shows a structural schematic diagram of a tele end of a zoom lens assembly according to Example 1.

As shown in FIGS. 1-3, the zoom lens assembly sequentially includes from an object side to an image side: a first lens group G1, a diaphragm STO, a second lens group G2, a third lens group G3, a fourth lens group G4, an optical filter E9 and an imaging surface S19. The first lens group G1 includes a first lens E1. The second lens group G2 includes a second lens E2, a third lens E3, and a fourth lens E4. The third lens group G3 includes a fifth lens E5 and a sixth lens E6. The fourth lens group G4 includes a seventh lens E7 and an eighth lens E8.

The first lens E1 has a positive refractive power or a negative refractive power, an object-side surface S1 of the first lens is a concave surface, and an image-side surface S2 of the first lens is a convex surface. The second lens E2 has a positive refractive power or a negative refractive power, an object-side surface S3 of the second lens is a convex surface, and an image-side surface S4 of the second lens is a concave surface. The third lens E3 has a positive refractive power or a negative refractive power, an object-side surface S5 of the third lens is a convex surface, and an image-side surface S6 of the third lens is a concave surface. The fourth lens E4 has a positive refractive power or a negative refractive power, an object-side surface S7 of the fourth lens is a convex surface, and an image-side surface S8 of the fourth lens is a concave surface. The fifth lens E5 has a positive refractive power or a negative refractive power, an object-side surface S9 of the fifth lens is a convex surface, and an image-side surface S10 of the fifth lens is a concave surface. The sixth lens E6 has a positive refractive power or a negative refractive power, an object-side surface S11 of the sixth lens is a convex surface, and an image-side surface S12 of the sixth lens is a convex surface. The seventh lens E7 has a positive refractive power or a negative refractive power, an object-side surface S13 of the seventh lens is a concave surface, and an image-side surface S14 of the seventh lens is a convex surface. The eighth lens E8 has a positive refractive power or a negative refractive power, an object-side surface S15 of the eighth lens is a concave surface, and an image-side surface S16 of the eighth lens is a convex surface. The optical filter E9 has an object-side surface S17 of the optical filter and an image-side surface S18 of the optical filter. Light from an object sequentially penetrates through each of the surfaces S1 to S18 and is finally imaged on the imaging surface S19. At least one of the second lens E2, the third lens E3 and the fourth lens E4 has a positive refractive power. At least one of the seventh lens E7 and the eighth lens E8 has a positive refractive power.

Table 1 shows a basic structural parameter table of the zoom lens assembly of Example 1, wherein the units of the curvature radius, the thickness/distance and the focal length are all millimeters (mm).

TABLE 1

| Surface number | Surface type | Curvature radius | Thickness | Material Refractive index | Abbe number | Conic coefficient |
|---|---|---|---|---|---|---|
| OBJ | Spherical | Infinite | Infinite, 1,500 | | | |
| S1 | Aspheric | −14.7888 | 0.8471 | 1.546 | 56.13 | 3.008 |
| S2 | Aspheric | −13.9308 | T1 | | | 5.578 |
| STO | Spherical | Infinite | 0.1000 | | | |
| S3 | Aspheric | 29.5182 | 0.8135 | 1.677 | 19.24 | −3.737 |
| S4 | Aspheric | 16.1101 | 0.1000 | | | 6.600 |
| S5 | Aspheric | 6.0337 | 1.7598 | 1.546 | 56.13 | 0.747 |
| S6 | Aspheric | 5.0746 | 0.2686 | | | −5.869 |
| S7 | Aspheric | 7.2873 | 0.8034 | 1.546 | 56.13 | −7.960 |
| S8 | Aspheric | 157.6815 | T2 | | | 10.000 |
| S9 | Aspheric | 14.4289 | 1.9391 | 1.677 | 19.24 | −9.162 |
| S10 | Aspheric | 7.7088 | 0.3085 | | | −6.025 |

TABLE 1-continued

| Surface number | Surface type | Curvature radius | Thickness | Material Refractive index | Material Abbe number | Conic coefficient |
|---|---|---|---|---|---|---|
| S11 | Aspheric | 14.3613 | 1.7731 | 1.546 | 56.13 | −9.781 |
| S12 | Aspheric | −7.5214 | T3 | | | −1.616 |
| S13 | Aspheric | −3.9961 | 0.8007 | 1.653 | 23.52 | −0.291 |
| S14 | Aspheric | −3.4095 | 0.1375 | | | −2.402 |
| S15 | Aspheric | −4.2461 | 0.8000 | 1.546 | 56.13 | 5.094 |
| S16 | Aspheric | −678.3219 | 1.3576, T4 | | | −10.000 |
| S17 | Spherical | Infinite | 0.2100 | 1.518 | 64.17 | |
| S18 | Spherical | Infinite | 0.3900 | | | |
| S19 | Spherical | Infinite | | | | |

Table 2 shows parameters of the zoom lens assembly of Example 1. The units of an effective focal length f, a numerical aperture Fno, a distance T1 between the first lens group G1 and the second lens group G2, a distance T2 between the second lens group G2 and the third lens group G3, a distance T3 between the third lens group G3 and the fourth lens group G4 and a distance T4 between the fourth lens group G4 and the optical filter E9 are all millimeters (mm), and a unit of a maximum field of view of the zoom lens assembly is degree.

TABLE 2

| | f | FOV | Fno | T1 | T2 | T3 | T4 |
|---|---|---|---|---|---|---|---|
| Wide end | 13.87 | 34.8 | 2.90 | 9.6162 | 0.9355 | 5.0915 | 1.1726 |
| Middle end | 18.47 | 25.9 | 3.92 | 3.3165 | 9.4939 | 2.8328 | 1.0216 |
| Tele end | 23.09 | 20.6 | 4.94 | 0.6162 | 14.4270 | 0.6000 | 0.8166 |

In Example 1, both the object-side surface and the image-side surface of any lens in the first lens E1 to the eighth lens E8 are aspheric surfaces, and a surface type of each aspheric lens may be defined through, but not limited to, the following aspheric surface formula:

$$x = \frac{ch^2}{1+\sqrt{1-(k+1)c^2h^2}} + \sum A_i h^i, \quad (1)$$

wherein x is a vector height of a distance between the aspheric surface and a vertex of the aspheric surface when the aspheric surface is located at a position with the height h along the optical axis direction; c is a paraxial curvature of the aspheric surface, c=1/R (namely, the paraxial curvature c is a reciprocal of the curvature radius R in Table 1 above); k is a conic coefficient; and Ai is a correction coefficient of the i-th order of the aspheric surface. Table 3 shows high-order coefficients A4, A6, A8, A10, A12, A14, A16, A18, and A20 applied to the aspheric mirror surfaces S1-S16 in Example 1.

TABLE 3

| Surface number | A4 | A6 | A8 | A10 | A12 | A14 | A16 | A18 | A20 |
|---|---|---|---|---|---|---|---|---|---|
| S1 | −9.3249E−02 | −4.4325E−04 | 4.2365E−04 | −5.1281E−05 | 2.6538E−05 | −2.7306E−05 | 1.7828E−05 | −6.9623E−06 | 1.1232E−06 |
| S2 | −8.1431E−02 | 7.3407E−03 | 9.8724E−04 | −7.1724E−04 | −3.6549E−04 | −2.2842E−04 | 6.8454E−05 | −3.9340E−05 | 1.4064E−05 |
| S3 | 3.3880E−02 | −8.4082E−03 | 2.1285E−03 | −6.2612E−04 | −2.1339E−04 | −3.5649E−04 | −1.5068E−04 | −7.8643E−05 | −4.7211E−06 |
| S4 | 2.6292E−02 | −1.2335E−02 | 2.5544E−03 | −2.4374E−03 | −1.1298E−03 | −1.3532E−03 | −3.4153E−04 | −1.8446E−04 | 7.9997E−05 |
| S5 | −9.1646E−02 | 3.3432E−03 | −1.7678E−03 | −9.1604E−04 | −1.3644E−04 | −3.9935E−04 | 4.5271E−06 | −1.0830E−04 | 7.7011E−06 |
| S6 | −2.0138E−01 | 2.2667E−02 | −9.3484E−03 | −9.0603E−04 | −1.0112E−03 | −1.6043E−04 | −2.0330E−04 | −2.0852E−04 | −1.1166E−04 |
| S7 | −1.5919E−01 | 4.1860E−02 | −8.2790E−03 | −3.1249E−04 | −7.4778E−06 | 2.6212E−04 | −1.8304E−04 | −3.2777E−04 | −1.6844E−04 |
| S8 | 1.0171E−01 | 2.0887E−02 | −7.3838E−05 | −3.7019E−05 | 1.6534E−04 | 1.7717E−04 | 1.0543E−04 | 1.5954E−05 | −1.1786E−05 |
| S9 | −3.7270E−01 | −1.0670E−02 | 3.6759E−03 | 3.9103E−03 | 2.3170E−03 | 1.2214E−03 | 6.8656E−04 | 2.6772E−04 | 8.0838E−05 |
| S10 | −3.8994E−01 | −1.1237E−04 | −1.1276E−03 | 3.0621E−03 | 2.0019E−03 | 2.7802E−04 | 8.8418E−04 | 1.2274E−04 | 1.0974E−04 |
| S11 | −2.9436E−01 | 5.2932E−02 | 2.3836E−03 | 4.7128E−03 | 2.8259E−03 | 5.0752E−04 | 1.2700E−03 | −2.5991E−04 | 6.6400E−05 |
| S12 | −2.8375E−01 | 1.2499E−01 | 8.9329E−03 | 1.9635E−04 | 3.8631E−03 | −3.8461E−03 | −6.6543E−03 | −3.7440E−03 | −5.4508E−04 |
| S13 | 1.5557E+00 | −1.1873E−01 | 1.0286E−02 | −1.0041E−03 | 4.5374E−04 | −3.0076E−04 | −2.8848E−05 | −1.1919E−04 | −3.5322E−05 |
| S14 | 3.8356E−01 | 2.1983E+00 | 1.6826E+00 | 9.7277E−01 | 5.0456E−01 | −3.6041E−01 | −1.6457E−01 | 3.3701E−02 | −8.9726E−03 |
| S15 | −5.7266E−01 | 2.2392E−01 | −1.3290E−01 | −5.1007E−02 | −5.2479E−02 | −2.0179E−02 | −7.9051E−03 | −1.3260E−03 | −2.2595E−04 |
| S16 | 1.6162E+01 | −2.4645E+00 | −1.5858E+00 | 6.7455E−01 | 5.9717E−01 | 2.6761E−01 | 1.0082E−01 | 2.4973E−02 | −6.6581E−03 |

Figure 4:
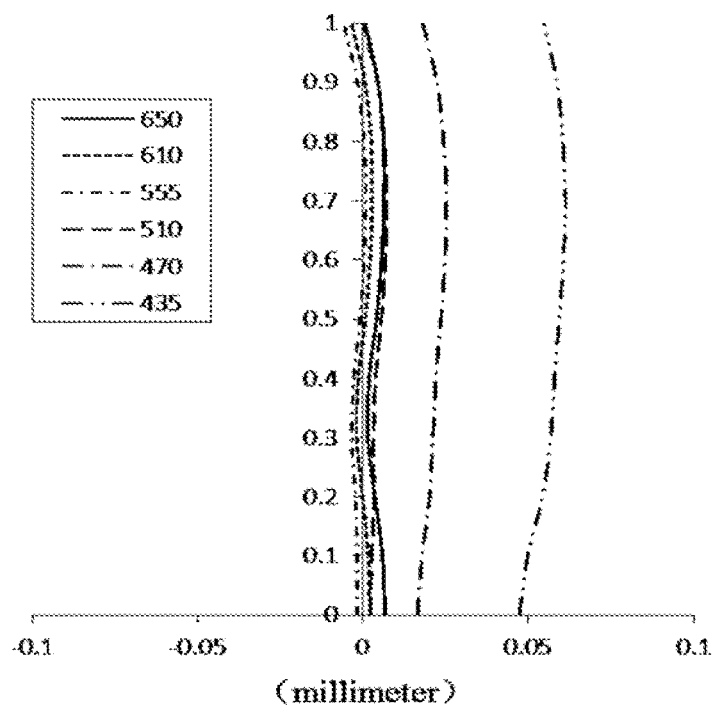
FIGS. 4-7 show a longitudinal aberration curve, an astigmatism curve, a distortion curve and a lateral color curve of the zoom lens assembly in FIG. 1 respectively.
Figure 5:
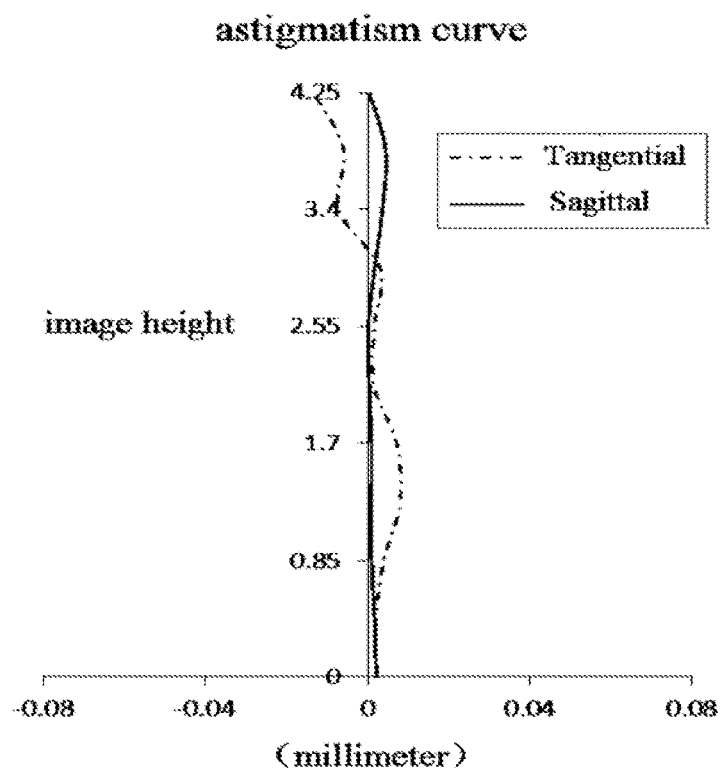
Figure 6:
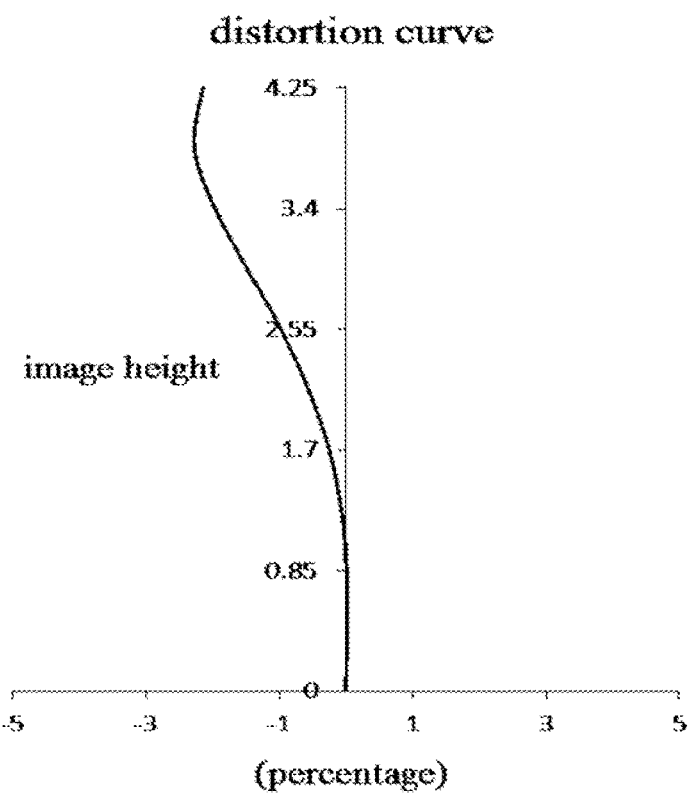
Figure 7:
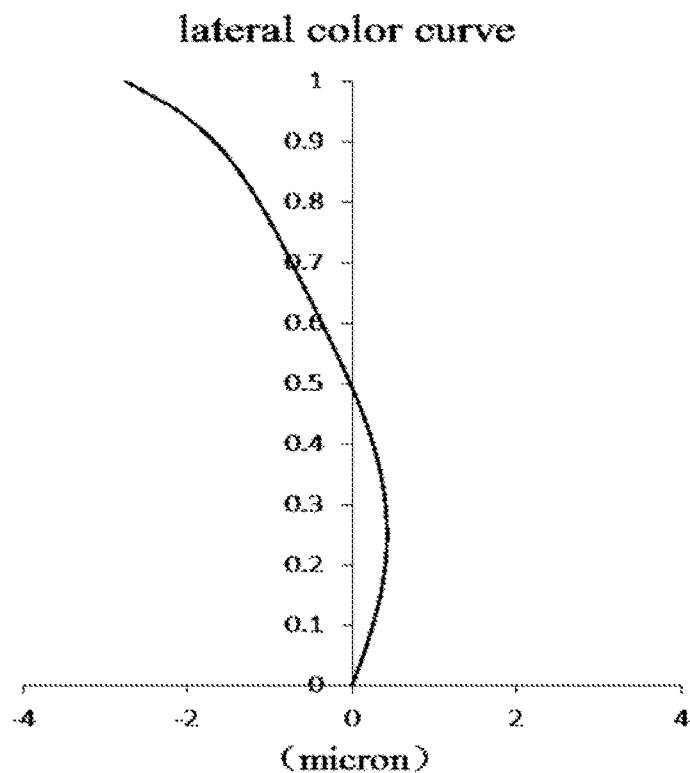

FIG. 4 shows a longitudinal aberration curve of the wide end of the zoom lens assembly according to Example 1 to represent deviation of a convergence focal point after light of different wavelengths passes through the lens. FIG. 5 shows an astigmatism curve of the wide end of the zoom lens assembly according to Example 1 to represent a tangential image surface curvature and a sagittal image surface curvature. FIG. 6 shows a distortion curve of the wide end of the zoom lens assembly according to Example 1 to represent distortion values corresponding to different fields of view. FIG. 7 shows a lateral color curve of the wide end of the zoom lens assembly according to Example 1 to represent deviation of different image heights on the imaging surface after the light passes through the lens.

Figure 8:
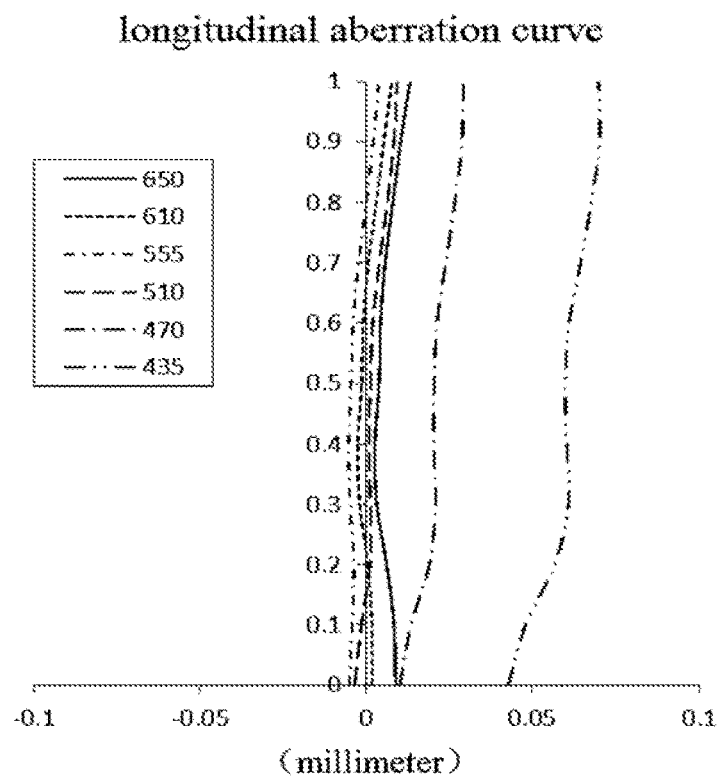
FIGS. 8-11 show a longitudinal aberration curve, an astigmatism curve, a distortion curve and a lateral color curve of the zoom lens assembly in FIG. 2 respectively.
Figure 9:
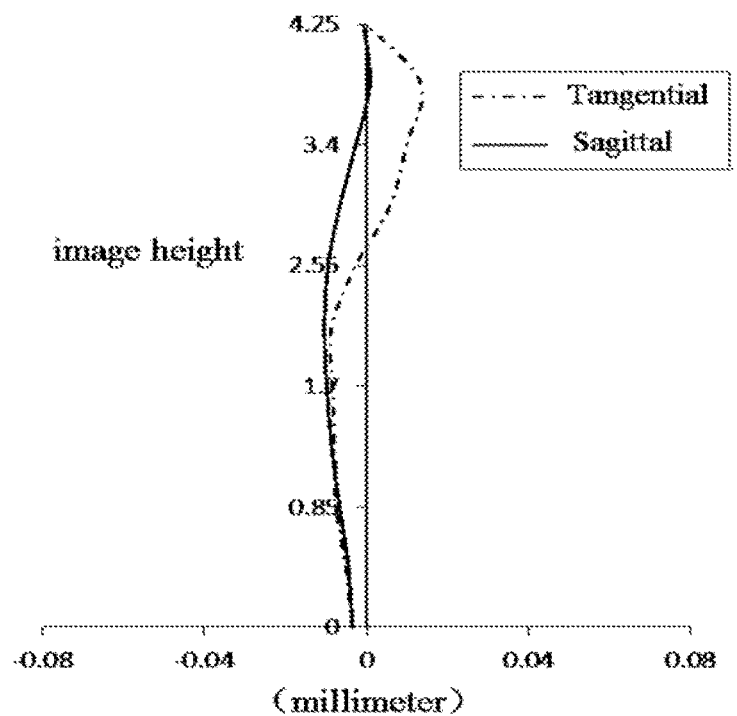
Figure 10:
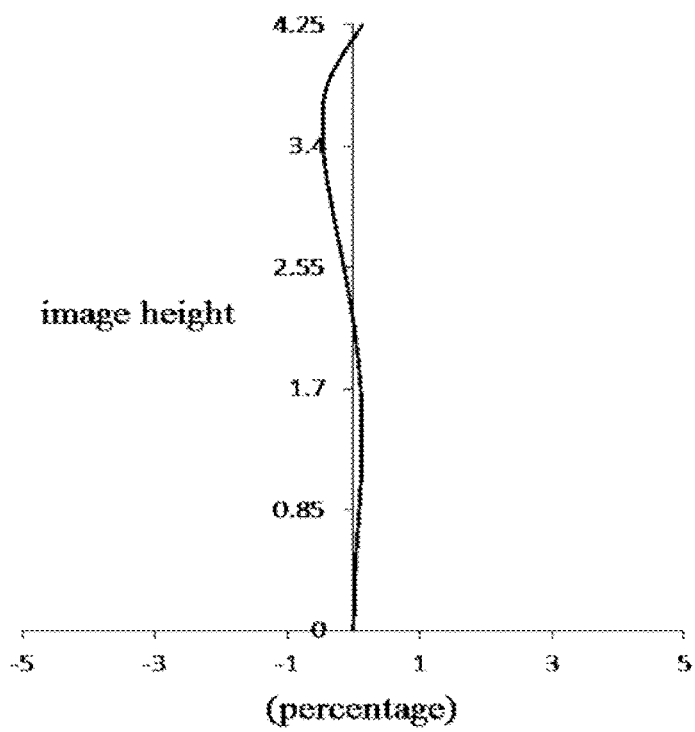
Figure 11:
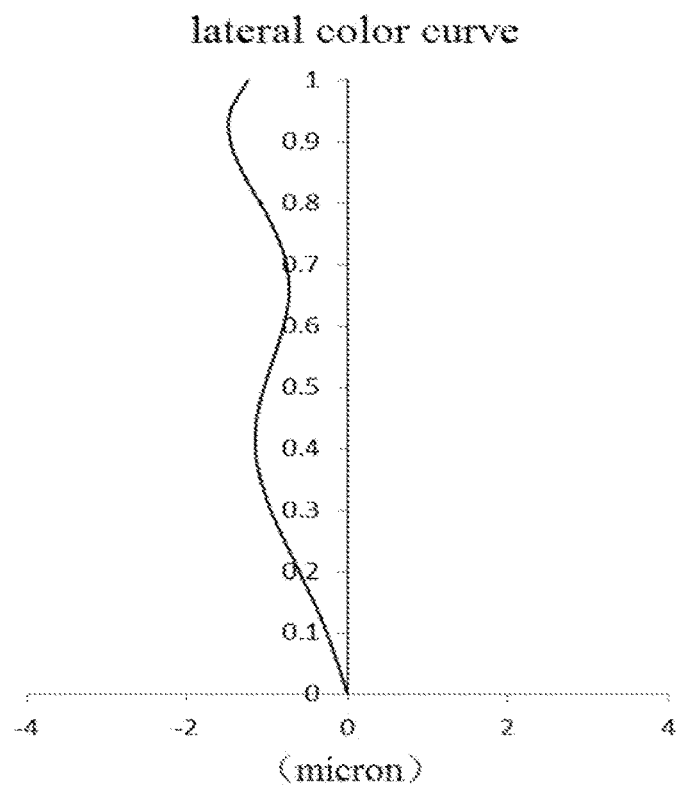

FIG. 8 shows a longitudinal aberration curve of the middle end of the zoom lens assembly according to Example 1 to represent deviation of a convergence focal point after light of different wavelengths passes through the lens. FIG. 9 shows an astigmatism curve of the middle end of the zoom lens assembly according to Example 1 to represent a tangential image surface curvature and a sagittal image surface curvature. FIG. 10 shows a distortion curve of the middle end of the zoom lens assembly according to Example 1 to represent distortion values corresponding to different fields of view. FIG. 11 shows a lateral color curve of the middle end of the zoom lens assembly according to Example 1 to represent deviation of different image heights on the imaging surface after the light passes through the lens.

Figure 12:
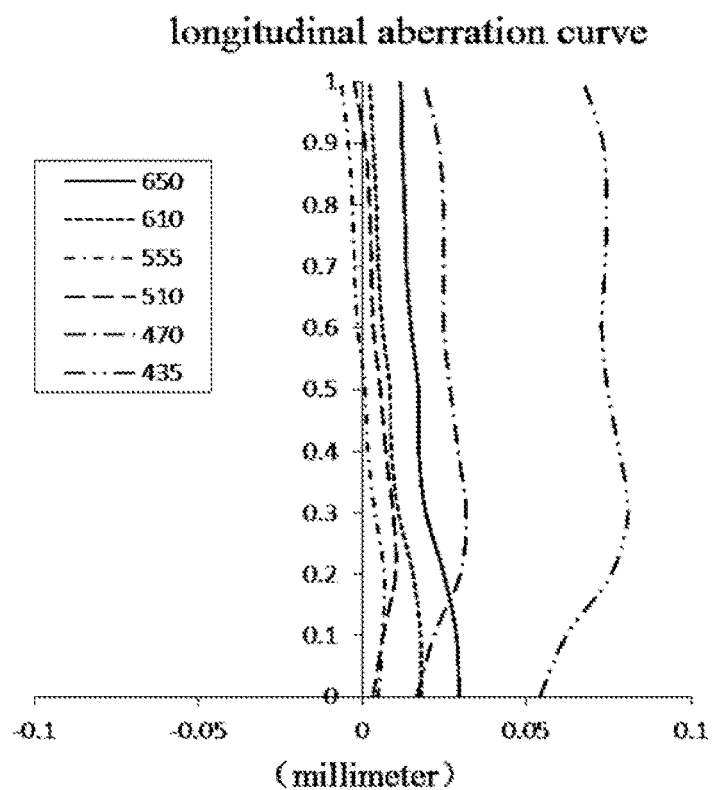
FIGS. 12-15 show a longitudinal aberration curve, an astigmatism curve, a distortion curve and a lateral color curve of the zoom lens assembly in FIG. 3 respectively.
Figure 13:
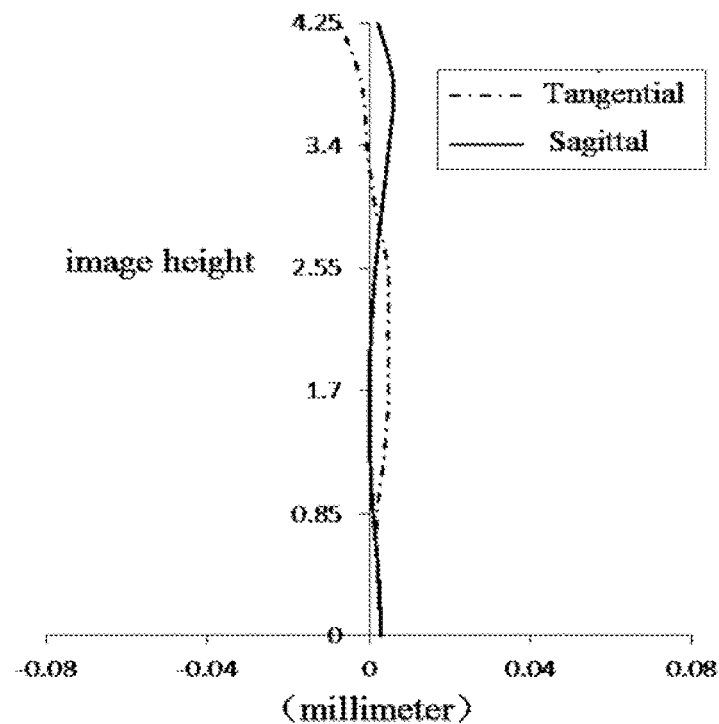
Figure 14:
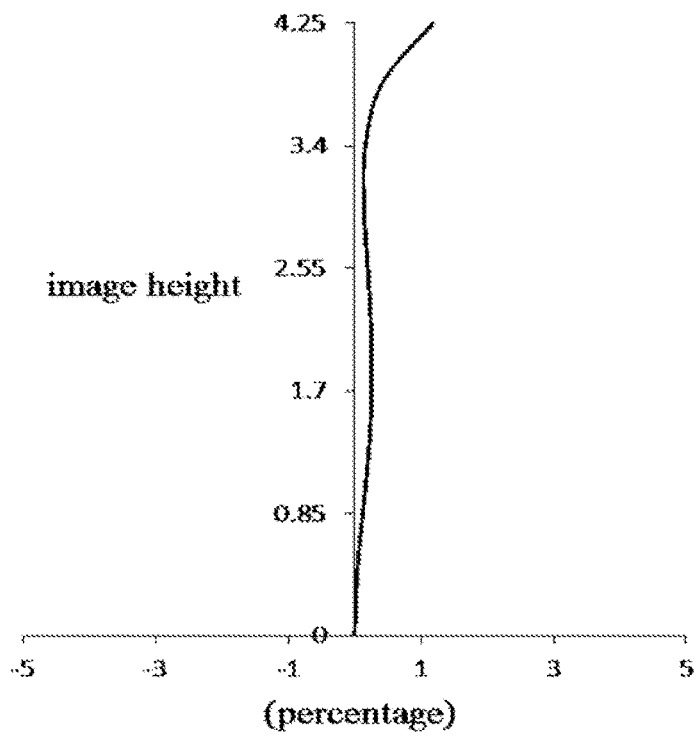
Figure 15:
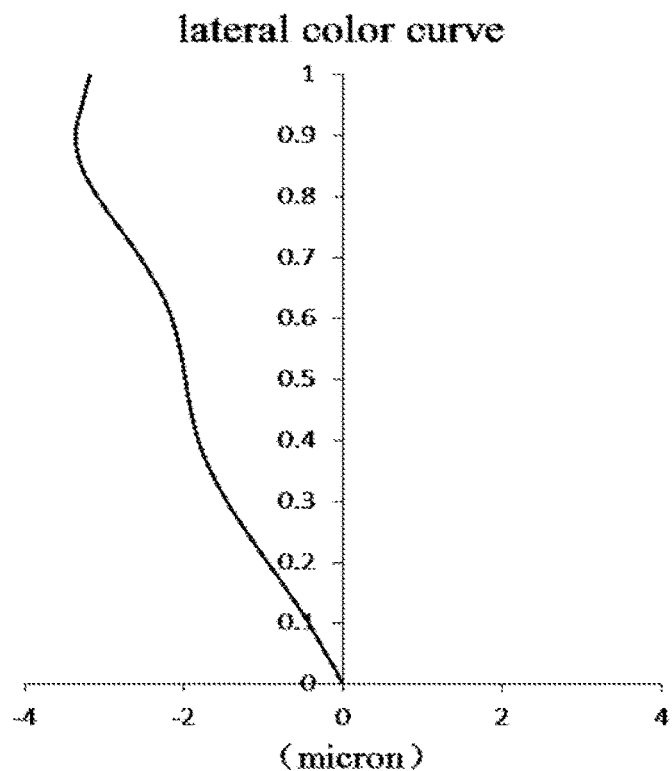

FIG. 12 shows a longitudinal aberration curve of the tele end of the zoom lens assembly according to Example 1 to represent deviation of a convergence focal point after light of different wavelengths passes through the lens. FIG. 13 shows an astigmatism curve of the tele end of the zoom lens assembly according to Example 1 to represent a tangential image surface curvature and a sagittal image surface curvature. FIG. 14 shows a distortion curve of the tele end of the zoom lens assembly according to Example 1 to represent distortion values corresponding to different fields of view. FIG. 15 shows a lateral color curve of the tele end of the zoom lens assembly according to Example 1 to represent deviation of different image heights on the imaging surface after the light passes through the lens.

According to FIGS. 4-15, it can be seen that the zoom lens assembly provided in Example 1 may achieve high imaging quality.

Example 2

Figure 16:
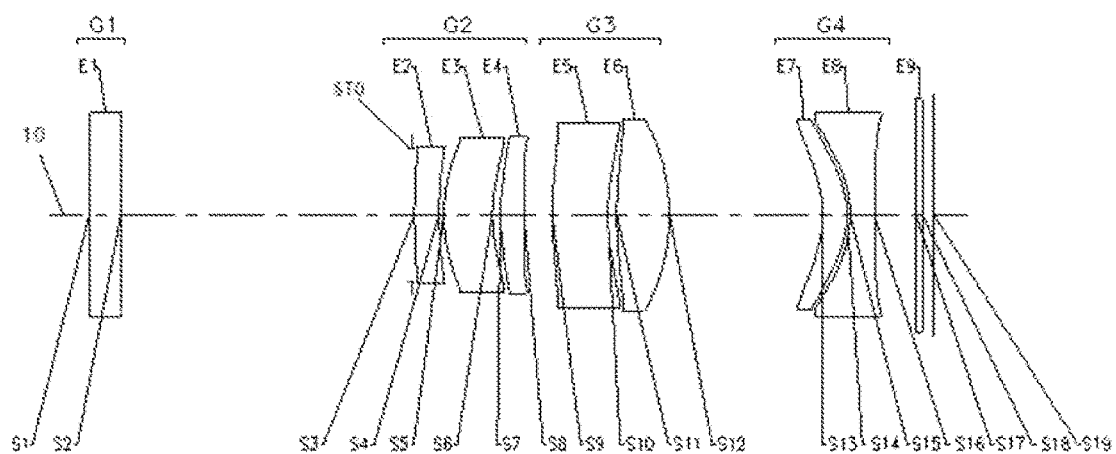
FIG. 16 shows a structural schematic diagram of a wide end of a zoom lens assembly according to Example 2 of the disclosure.
Figure 17:
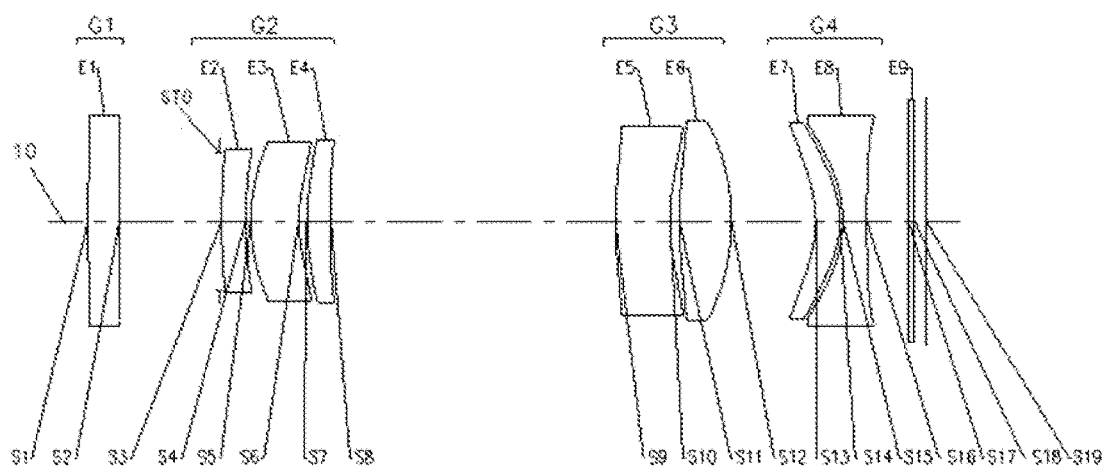
FIG. 17 shows a structural schematic diagram of a middle end of a zoom lens assembly according to Example 2 of the disclosure.
Figure 18:
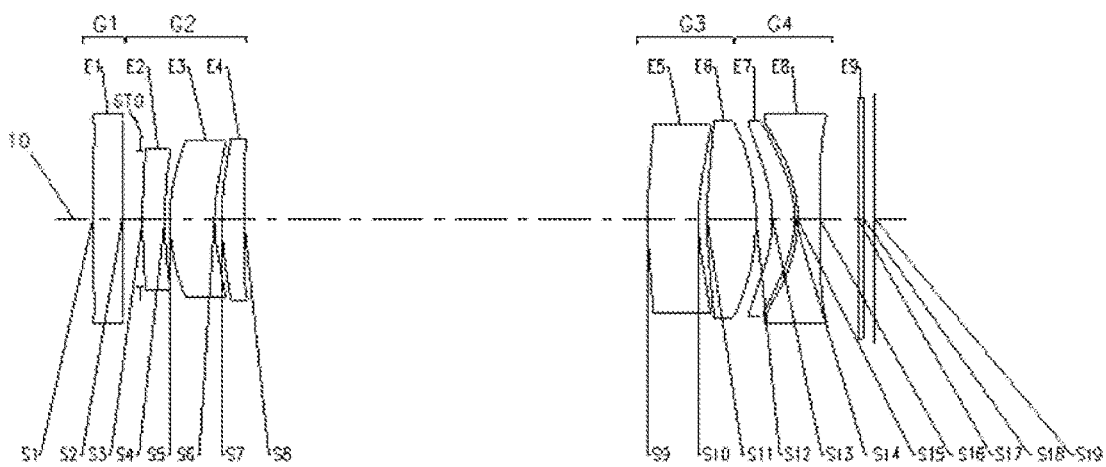
FIG. 18 shows a structural schematic diagram of a tele end of a zoom lens assembly according to Example 2 of the disclosure.

As shown in FIGS. 16-30, a zoom lens assembly according to Example 2 of the disclosure is described. In the embodiment and the following embodiments, parts of descriptions similar to those about Example 1 are omitted for simplicity. FIG. 16 shows a structural schematic diagram of a wide end of a zoom lens assembly according to Example 2. FIG. 17 shows a structural schematic diagram of a middle end of a zoom lens assembly according to Example 2. FIG. 18 shows a structural schematic diagram of a tele end of a zoom lens assembly according to Example 2.

As shown in FIGS. 16-18, the zoom lens assembly sequentially includes from an object side to an image side: a first lens group G1, a diaphragm STO, a second lens group G2, a third lens group G3, a fourth lens group G4, an optical filter E9 and an imaging surface S19. The first lens group G1 includes a first lens E1. The second lens group G2 includes a second lens E2, a third lens E3 and a fourth lens E4. The third lens group G3 includes a fifth lens E5 and a sixth lens E6. The fourth lens group G4 includes a seventh lens E7 and an eighth lens E8.

The first lens E1 has a positive refractive power or a negative refractive power, an object-side surface S1 of the first lens is a convex surface, and an image-side surface S2 of the first lens is a concave surface. The second lens E2 has a positive refractive power or a negative refractive power, an object-side surface S3 of the second lens is a convex surface, and an image-side surface S4 of the second lens is a concave surface. The third lens E3 has a positive refractive power or a negative refractive power, an object-side surface S5 of the third lens is a convex surface, and an image-side surface S6 of the third lens is a concave surface. The fourth lens E4 has a positive refractive power or a negative refractive power, an object-side surface S7 of the fourth lens is a convex surface, and an image-side surface S8 of the fourth lens is a concave surface. The fifth lens E5 has a positive refractive power or a negative refractive power, an object-side surface S9 of the fifth lens is a convex surface, and an image-side surface S10 of the fifth lens is a concave surface. The sixth lens E6 has a positive refractive power or a negative refractive power, an object-side surface S11 of the sixth lens is a convex surface, and an image-side surface S12 of the sixth lens is a convex surface. The seventh lens E7 has a positive refractive power or a negative refractive power, an object-side surface S13 of the seventh lens is a concave surface, and an image-side surface S14 of the seventh lens is a convex surface. The eighth lens E8 has a positive refractive power or a negative refractive power, an object-side surface S15 of the eighth lens is a concave surface, and an image-side surface S16 of the eighth lens is a concave surface. The optical filter E9 has an object-side surface S17 of the optical filter and an image-side surface S18 of the optical filter. Light from an object sequentially penetrates through each of the surfaces S1 to S18 and is finally imaged on the imaging surface S19. At least one of the second lens E2, the third lens E3 and the fourth lens E4 has a positive refractive power. At least one of the seventh lens E7 and the eighth lens E8 has a positive refractive power.

Table 4 shows a basic structural parameter table of the zoom lens assembly of Example 2, wherein the units of the curvature radius, the thickness/distance, and the focal length are all millimeters (mm).

| Surface number | Surface type | Curvature radius | Thickness | Refractive index | Abbe number | Conic co-efficient |
|---|---|---|---|---|---|---|
| OBJ | Spherical | Infinite | Infinite | | | |
| S1 | Aspheric | 60.0000 | 1.0481 | 1.546 | 56.13 | 10.0000 |
| S2 | Aspheric | 86.6841 | T1 | | | −10.0000 |
| STO | Spherical | Infinite | 0.1000 | | | |
| S3 | Aspheric | 29.3481 | 0.8000 | 1.677 | 19.24 | −6.8029 |
| S4 | Aspheric | 16.3141 | 0.1697 | | | 6.8442 |
| S5 | Aspheric | 6.0559 | 1.5952 | 1.546 | 56.13 | 0.7388 |
| S6 | Aspheric | 4.8418 | 0.2721 | | | −5.8831 |
| S7 | Aspheric | 6.8198 | 0.8045 | 1.546 | 56.13 | −7.8910 |
| S8 | Aspheric | 194.5601 | T2 | | | 6.1391 |
| S9 | Aspheric | 13.3966 | 1.8189 | 1.677 | 19.24 | −9.4605 |
| S10 | Aspheric | 7.3043 | 0.3073 | | | −6.2195 |
| S11 | Aspheric | 13.5365 | 1.7422 | 1.546 | 56.13 | −9.9443 |
| S12 | Aspheric | −7.6657 | T3 | | | −1.6690 |
| S13 | Aspheric | −3.9997 | 0.8000 | 1.653 | 23.52 | −0.2951 |
| S14 | Aspheric | −3.3428 | 0.1000 | | | −2.3861 |
| S15 | Aspheric | −4.3489 | 0.8000 | 1.546 | 56.13 | −5.1360 |
| S16 | Aspheric | 706.6345 | 1.3715 | | | −10.0000 |
| S17 | Spherical | Infinite | 0.2100 | 1.518 | 64.17 | |
| S18 | Spherical | Infinite | 0.3900 | | | |
| S19 | Spherical | Infinite | | | | |

Table 4

Table 5 shows parameters of the zoom lens assembly of Example 2. The units of an effective focal length f, a numerical aperture Fno, a distance T1 between the first lens group G1 and the second lens group G2, a distance T2 between the second lens group G2 and the third lens group G3 and a distance T between the third lens group G3 and the fourth lens group G4 are all millimeters (mm), and a unit of a maximum field of view of the zoom lens assembly is degree.

TABLE 5

| | f | FOV | Fno | T1 | T2 | T3 |
|---|---|---|---|---|---|---|
| Wide end | 13.87 | 18.47 | 23.08 | 9.5938 | 1.1878 | 5.5585 |
| Middle end | 34.5 | 25.6 | 20.4 | 4.2610 | 10.0033 | 2.0758 |
| Tele end | 2.90 | 3.93 | 4.95 | 0.6817 | 14.1903 | 1.4681 |

Table 6 shows high-order coefficients applied to each aspheric mirror surface in Example 2. A surface type of each aspheric surface may be defined by formula (1) given in Example 1.

Figure 30:
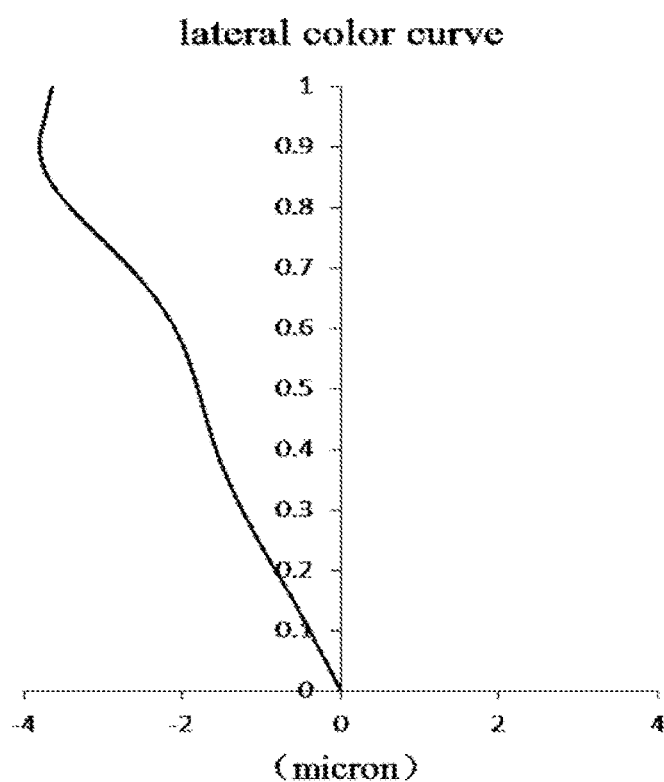

FIG. 30 shows a lateral color curve of the tele end of the zoom lens assembly according to Example 2 to represent deviation of different image heights on the imaging surface after the light passes through the lens.

TABLE 6

| Surface number | A4 | A6 | A8 | A10 | A12 | A14 | A16 | A18 | A20 |
|---|---|---|---|---|---|---|---|---|---|
| S1 | −8.1384E−02 | −2.3105E−03 | 4.0239E−04 | −1.0048E−05 | 8.7722E−06 | −2.4528E−05 | 1.6613E−05 | −4.1207E−06 | 1.9080E−06 |
| S2 | −1.1016E−01 | −1.2522E−03 | 1.9501E−03 | 5.8227E−04 | 3.5519E−04 | 1.4344E−04 | 3.5298E−05 | −2.9436E−05 | −1.6502E−06 |
| S3 | 3.2681E−02 | −7.3477E−03 | 2.4870E−03 | −8.1920E−04 | −3.8152E−04 | −4.8552E−04 | −1.7290E−04 | −9.9508E−05 | −9.2084E−06 |
| S4 | 2.7069E−02 | −1.2649E−02 | 2.6912E−03 | −2.7250E−03 | −9.4860E−04 | −1.2592E−03 | −3.1520E−04 | −3.1304E−04 | 3.4741E−06 |
| S5 | −9.2038E−02 | 3.1679E−03 | −1.7137E−03 | −1.2965E−03 | −3.2041E−04 | −5.6539E−04 | −3.5349E−06 | −9.6424E−05 | −1.0763E−05 |
| S6 | −2.0206E−01 | 2.2193E−02 | −8.9886E−03 | −6.9784E−04 | −8.1529E−04 | −8.8839E−05 | −1.0496E−04 | −1.2112E−04 | −1.0341E−04 |
| S7 | −1.5813E−01 | 4.1814E−02 | −8.4593E−03 | −3.9937E−04 | 3.5108E−06 | 1.9331E−04 | −2.0558E−04 | −2.6105E−04 | −1.6861E−04 |
| S8 | 9.9899E−02 | 2.2150E−02 | −2.5925E−04 | −1.3022E−04 | 1.6864E−04 | 1.6764E−04 | 5.8224E−05 | 6.4340E−06 | −1.7235E−05 |
| S9 | −3.7398E−01 | −8.7731E−03 | 3.9806E−03 | 3.5465E−03 | 2.3060E−03 | 1.2733E−03 | 7.2144E−04 | 2.6728E−04 | 8.7563E−05 |
| S10 | −3.9898E−01 | 8.9302E−04 | 9.6879E−04 | 1.7640E−03 | 2.6940E−03 | 3.1478E−05 | 1.0860E−03 | 1.3726E−04 | 9.6085E−05 |
| S11 | −3.0269E−01 | 5.2824E−02 | 2.7759E−03 | 3.9445E−03 | 4.2175E−03 | −5.1941E−04 | 1.2969E−03 | −5.3004E−04 | −1.2137E−04 |
| S12 | −2.7425E−01 | 1.2345E−01 | 6.8999E−03 | 2.0014E−03 | 3.6178E−03 | −4.3851E−03 | −5.7117E−03 | −3.7398E−03 | −6.8852E−04 |
| S13 | 1.5436E+00 | −1.0660E−01 | 1.1092E−03 | 5.0758E−04 | 1.1194E−03 | −9.8820E−04 | 4.8481E−04 | −1.3253E−04 | 3.5674E−05 |
| S14 | 2.8171E−02 | 2.2690E+00 | 1.6672E+00 | 9.6201E−01 | 5.1468E−01 | −3.5254E−01 | −1.7212E−01 | 4.6850E−02 | −3.7557E−02 |
| S15 | −5.6888E−01 | 2.2173E−01 | −1.3158E−01 | −5.8220E−02 | −5.1003E−02 | −2.0409E−02 | −8.4430E−03 | 1.3542E−05 | −1.4091E−04 |
| S16 | 1.5289E+01 | −3.1106E+00 | −1.4274E+00 | 6.6721E−01 | 5.6781E−01 | 2.8844E−01 | 1.0186E−01 | −1.5767E−02 | 1.4104E−02 |

Figure 19:
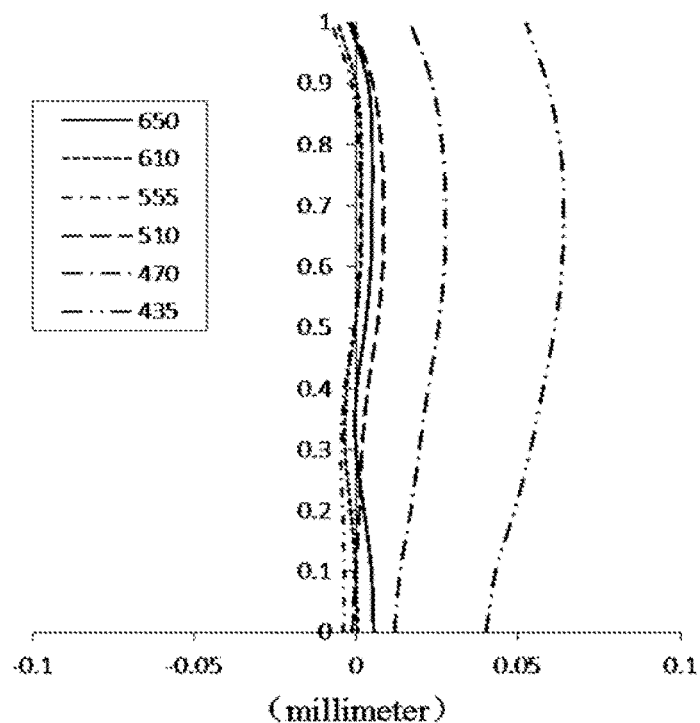
FIGS. 19-22 show a longitudinal aberration curve, an astigmatism curve, a distortion curve and a lateral color curve of the zoom lens assembly in FIG. 16 respectively.
Figure 20:
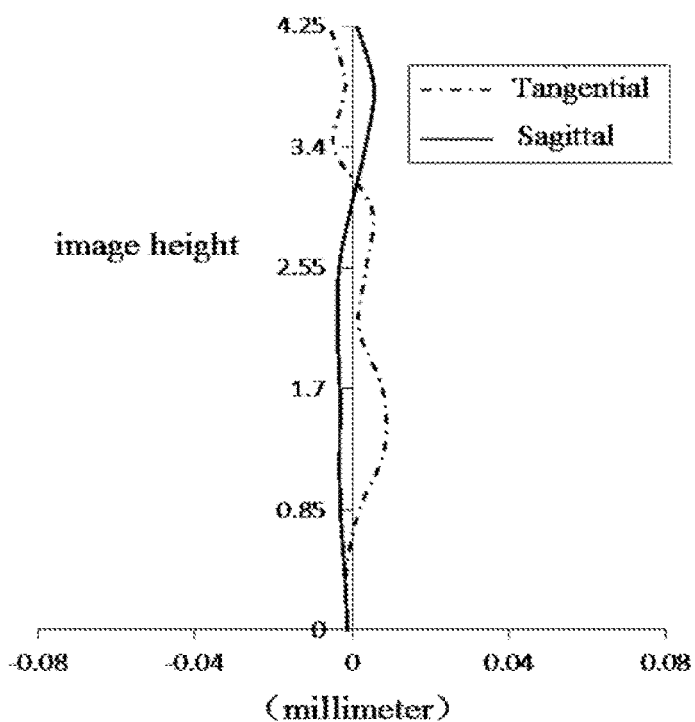
Figure 21:
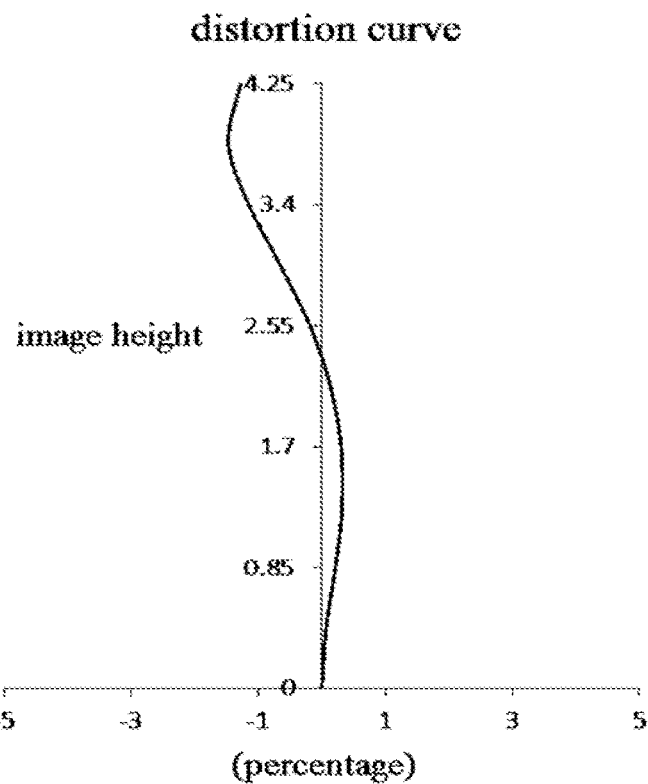
Figure 22:
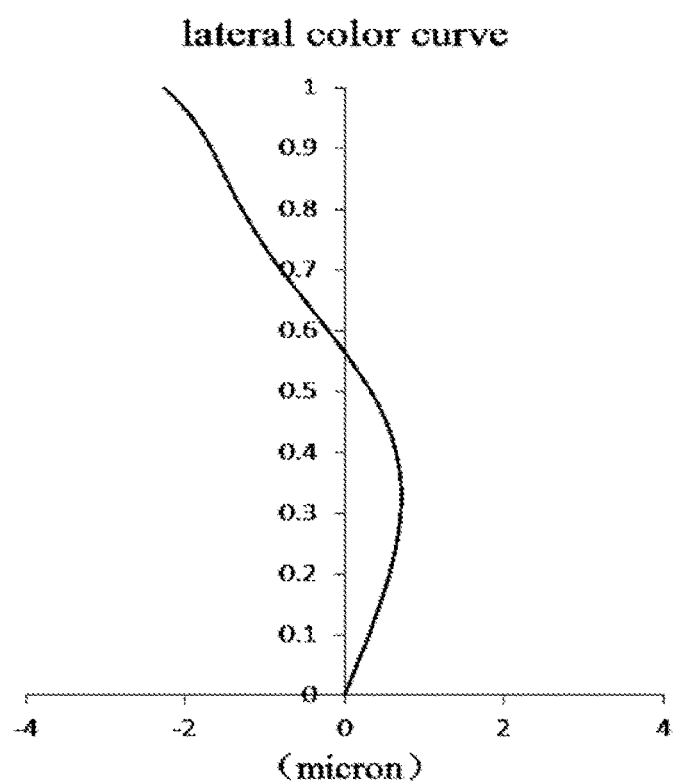

FIG. 19 shows a longitudinal aberration curve of the wide end of the zoom lens assembly according to Example 2 to represent deviation of a convergence focal point after light of different wavelengths passes through the lens. FIG. 20 shows an astigmatism curve of the wide end of the zoom lens assembly according to Example 2 to represent a tangential image surface curvature and a sagittal image surface curvature. FIG. 21 shows a distortion curve of the wide end of the zoom lens assembly according to Example 2 to represent distortion values corresponding to different fields of view. FIG. 22 shows a lateral color curve of the wide end of the zoom lens assembly according to Example 2 to represent deviation of different image heights on the imaging surface after the light passes through the lens.

Figure 23:
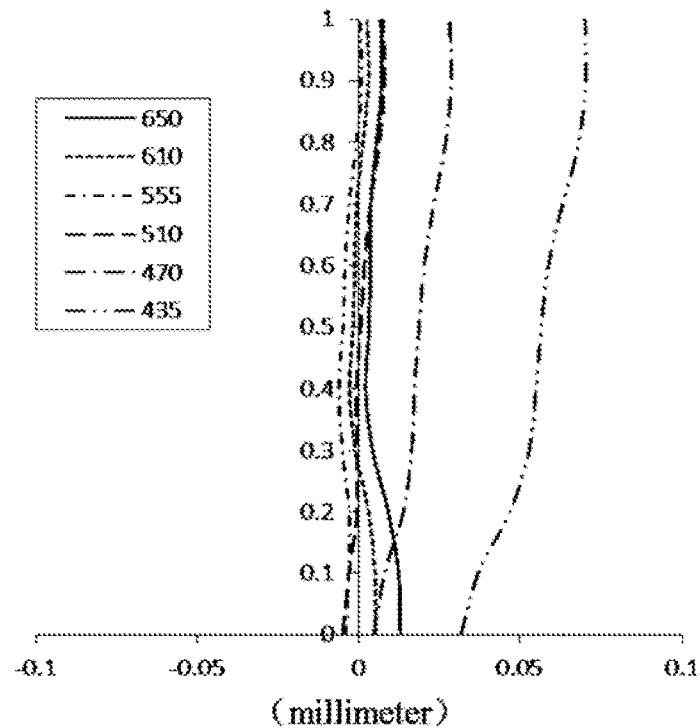
FIGS. 23-26 show a longitudinal aberration curve, an astigmatism curve, a distortion curve and a lateral color curve of the zoom lens assembly in FIG. 17 respectively.
Figure 24:
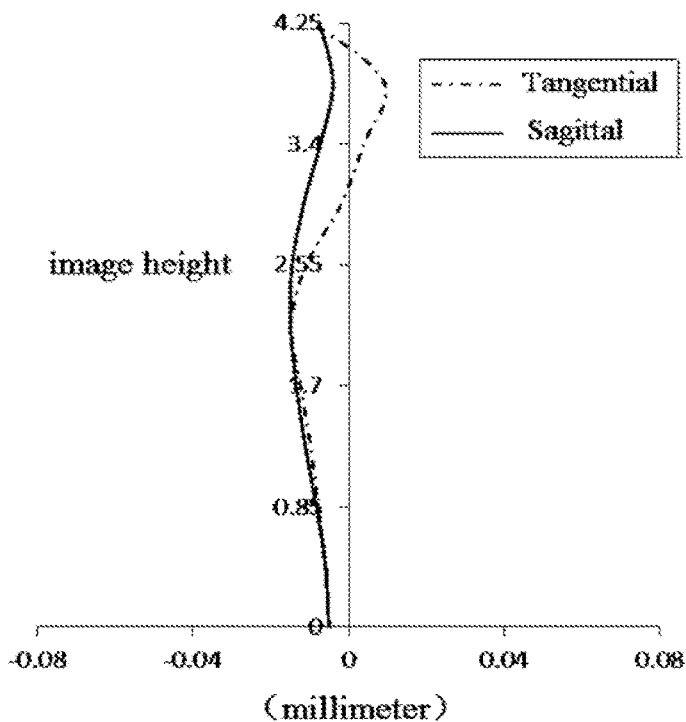
Figure 25:
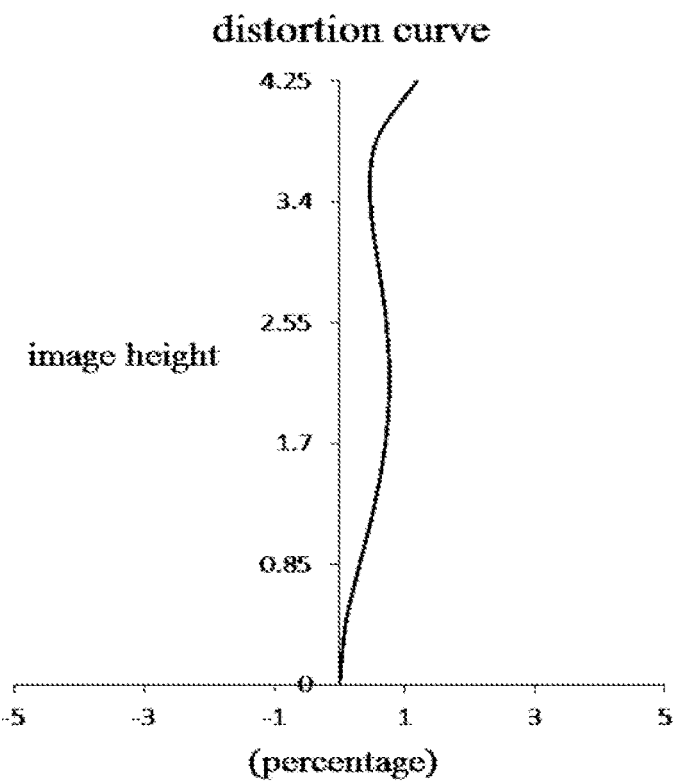
Figure 26:
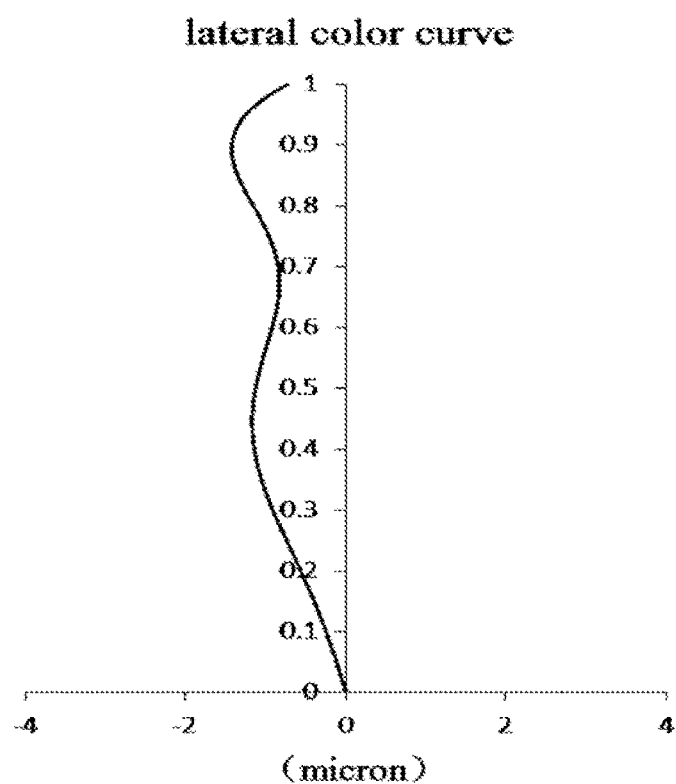

FIG. 23 shows a longitudinal aberration curve of the middle end of the zoom lens assembly according to Example 2 to represent deviation of a convergence focal point after light of different wavelengths passes through the lens. FIG. 24 shows an astigmatism curve of the middle end of the zoom lens assembly according to Example 2 to represent a tangential image surface curvature and a sagittal image surface curvature. FIG. 25 shows a distortion curve of the middle end of the zoom lens assembly according to Example 2 to represent distortion values corresponding to different fields of view. FIG. 26 shows a lateral color curve of the middle end of the zoom lens assembly according to Example 2 to represent deviation of different image heights on the imaging surface after the light passes through the lens.

Figure 27:
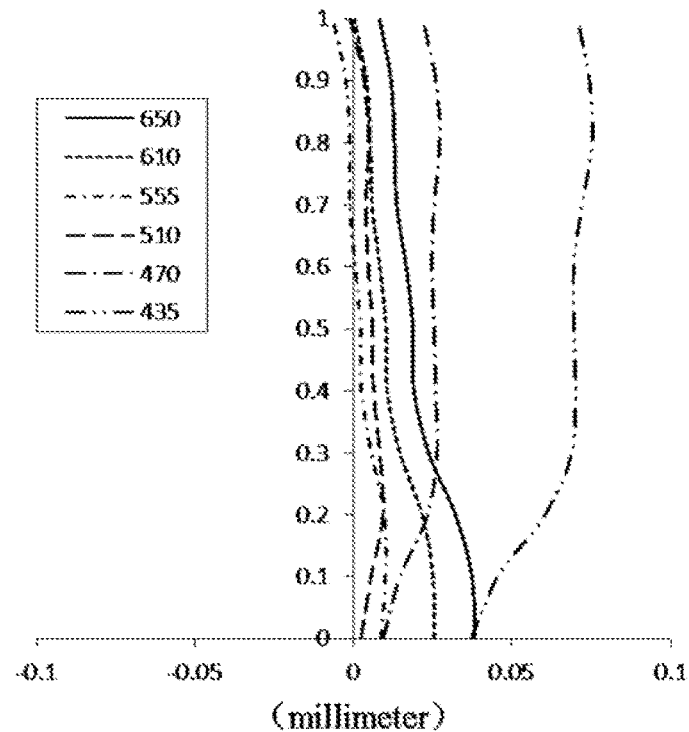
FIGS. 27-30 show a longitudinal aberration curve, an astigmatism curve, a distortion curve and a lateral color curve of the zoom lens assembly in FIG. 18 respectively.
Figure 28:
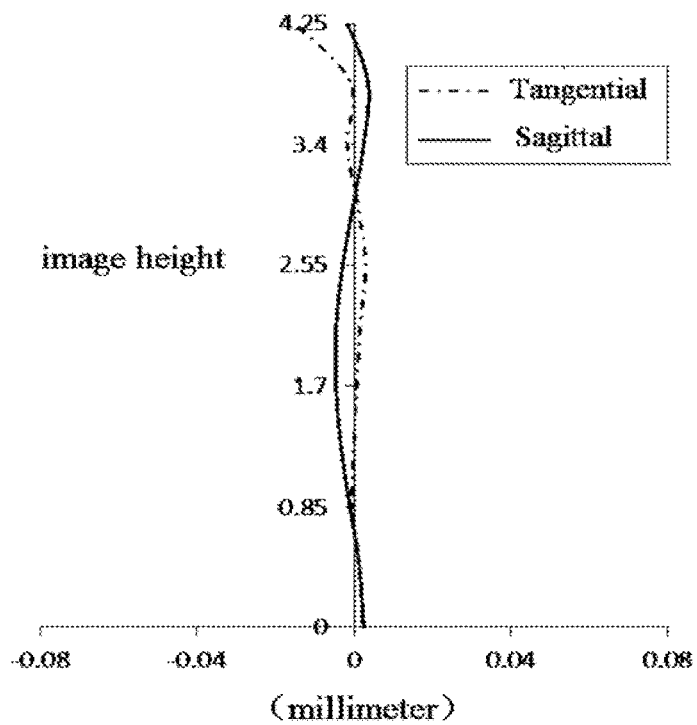
Figure 29:
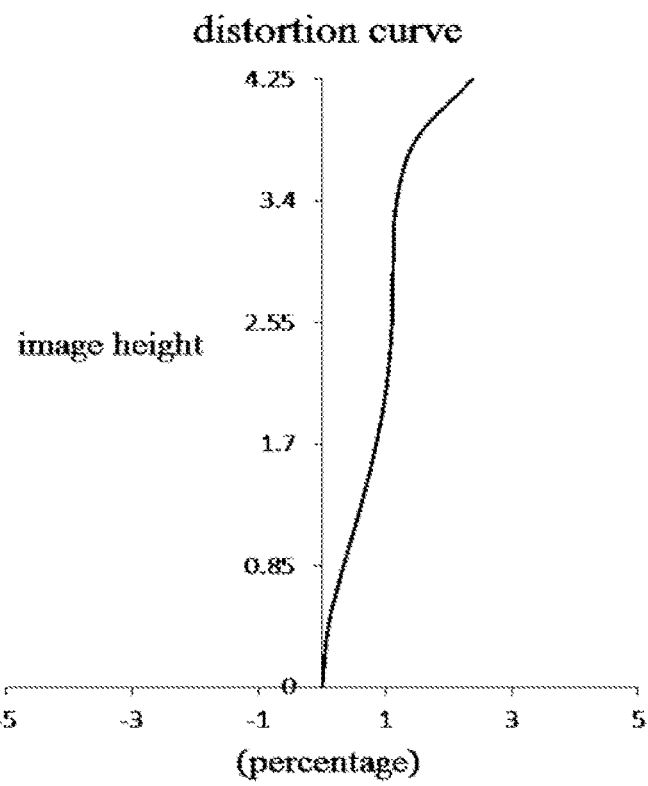

FIG. 27 shows a longitudinal aberration curve of the tele end of the zoom lens assembly according to Example 2 to represent deviation of a convergence focal point after light of different wavelengths passes through the lens. FIG. 28 shows an astigmatism curve of the tele end of the zoom lens assembly according to Example 2 to represent a tangential image surface curvature and a sagittal image surface curvature. FIG. 29 shows a distortion curve of the tele end of the zoom lens assembly according to Example 2 to represent distortion values corresponding to different fields of view.

According to FIGS. 19-30, it can be seen that the zoom lens assembly provided in Example 2 may achieve high imaging quality.

Example 3

Figure 31:
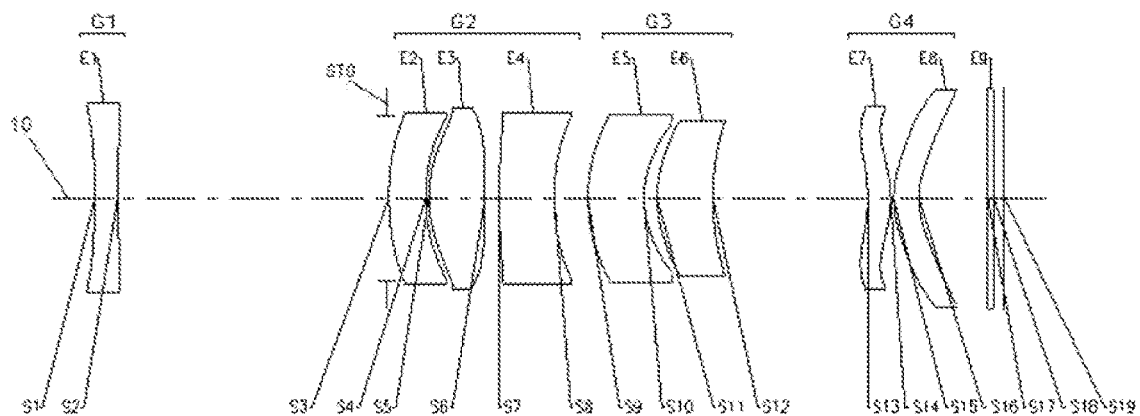
FIG. 31 shows a structural schematic diagram of a wide end of a zoom lens assembly according to Example 3 of the disclosure.
Figure 32:
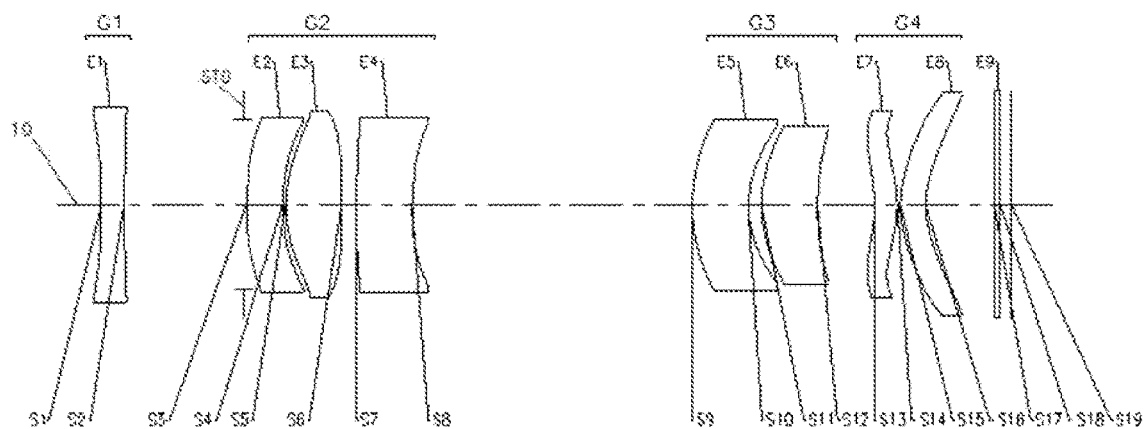
FIG. 32 shows a structural schematic diagram of a middle end of a zoom lens assembly according to Example 3 of the disclosure.
Figure 33:
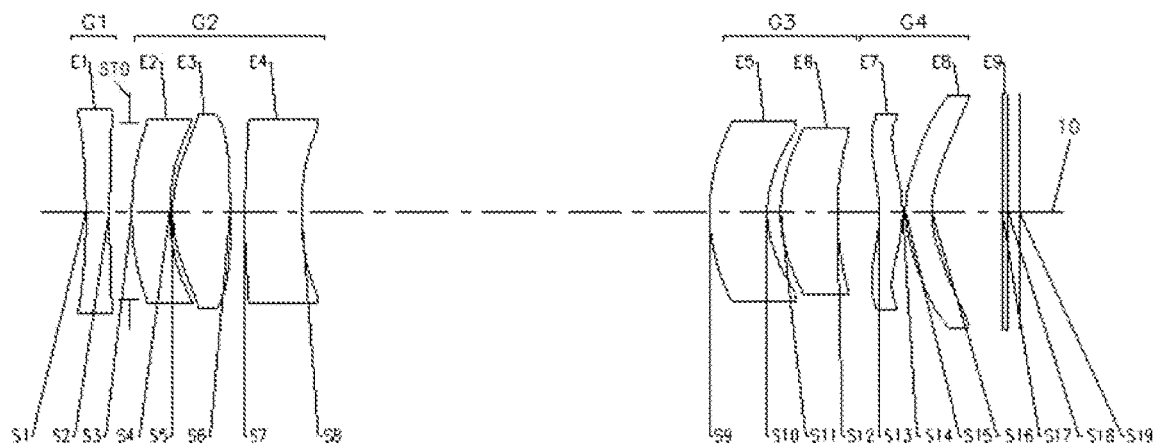
FIG. 33 shows a structural schematic diagram of a tele end of a zoom lens assembly according to Example 3 of the disclosure.

As shown in FIGS. 31-45, a zoom lens assembly according to Example 3 of the disclosure is described. In the embodiment and the following embodiments, parts of descriptions similar to those about Example 1 are omitted for simplicity. FIG. 31 shows a structural schematic diagram of a wide end of a zoom lens assembly according to Example 3. FIG. 32 shows a structural schematic diagram of a middle end of a zoom lens assembly according to Example 3. FIG. 33 shows a structural schematic diagram of a tele end of a zoom lens assembly according to Example 3.

As shown in FIGS. 31-33, the zoom lens assembly sequentially includes from an object side to an image side: a first lens group G1, a diaphragm STO, a second lens group G2, a third lens group G3, a fourth lens group G4, an optical filter E9 and an imaging surface S19. The first lens group G1 includes a first lens E1. The second lens group G2 includes a second lens E2, a third lens E3 and a fourth lens E4. The third lens group G3 includes a fifth lens E5 and a sixth lens E6. The fourth lens group G4 includes a seventh lens E7 and an eighth lens E8.

The first lens E1 has a positive refractive power or a negative refractive power, an object-side surface S1 of the first lens is a concave surface, and an image-side surface S2 of the first lens is a concave surface. The second lens E2 has a positive refractive power or a negative refractive power, an object-side surface S3 of the second lens is a convex surface, and an image-side surface S4 of the second lens is a concave surface. The third lens E3 has a positive refractive power or a negative refractive power, an object-side surface S5 of the third lens is a convex surface, and an image-side surface S6 of the third lens is a concave surface. The fourth lens E4 has a positive refractive power or a negative refractive power, an object-side surface S7 of the fourth lens is a convex surface, and an image-side surface S8 of the fourth lens is a concave surface. The fifth lens E5 has a positive refractive power or a negative refractive power, an object-side surface S9 of the fifth lens is a convex surface, and an image-side surface S10 of the fifth lens is a concave surface. The sixth lens E6 has a positive refractive power or a negative refractive power, an object-side surface S11 of the sixth lens is a convex surface, and an image-side surface S12 of the sixth lens is a concave surface. The seventh lens E7 has a positive refractive power or a negative refractive power, an object-side surface S13 of the seventh lens is a concave surface, and an image-side surface S14 of the seventh lens is a convex surface. The eighth lens E8 has a positive refractive power or a negative refractive power, an object-side surface S15 of the eighth lens is a convex surface, and an image-side surface S16 of the eighth lens is a concave surface. The optical filter E9 has an object-side surface S17 of the optical filter and an image-side surface S18 of the optical filter. Light from an object sequentially penetrates through each of the surfaces S1 to S18 and is finally imaged on the imaging surface S19. At least one of the second lens E2, the third lens E3 and the fourth lens E4 has a positive refractive power. At least one of the seventh lens E7 and the eighth lens E8 has a positive refractive power.

Table 7 shows a basic structural parameter table of the zoom lens assembly of Example 3, wherein the units of the curvature radius, the thickness/distance, and the focal length are all millimeters (mm).

TABLE 7

| Surface number | Surface type | Curvature radius | Thick-ness | Refractive index (Material) | Abbe number (Material) | Conic co-efficient |
|---|---|---|---|---|---|---|
| OBJ | Spherical | Infinite | Infinite | | | |
| S1 | Aspheric | −27.6931 | 0.8000 | 1.546 | 56.13 | 3.7227 |
| S2 | Aspheric | 43.5380 | T1 | | | −9.8724 |
| STO | Spherical | Infinite | 0.1000 | | | |
| S3 | Aspheric | 11.9188 | 1.3219 | 1.677 | 19.24 | 6.7193 |

TABLE 7-continued

| Surface number | Surface type | Curvature radius | Thick-ness | Refractive index (Material) | Abbe number (Material) | Conic co-efficient |
|---|---|---|---|---|---|---|
| S4 | Aspheric | 8.7674 | 0.1000 | | | 5.6402 |
| S5 | Aspheric | 5.2813 | 2.0000 | 1.546 | 56.13 | 0.3637 |
| S6 | Aspheric | 217.7445 | 0.5000 | | | 10.0000 |
| S7 | Aspheric | 25.5774 | 2.0000 | 1.546 | 56.13 | 9.8261 |
| S8 | Aspheric | 11.3515 | T2 | | | 1.4997 |
| S9 | Aspheric | 6.4086 | 2.0000 | 1.677 | 19.24 | −1.2215 |
| S10 | Aspheric | 3.7702 | 0.4689 | | | −2.1760 |
| S11 | Aspheric | 4.7529 | 1.9913 | 1.546 | 56.13 | −2.4237 |
| S12 | Aspheric | 10.1336 | T3 | | | 1.2822 |
| S13 | Aspheric | −5.0265 | 0.8000 | 1.653 | 23.52 | −0.2329 |
| S14 | Aspheric | −4.6622 | 0.1001 | | | −6.6431 |
| S15 | Aspheric | 3.8959 | 0.9113 | 1.546 | 56.13 | −1.1577 |
| S16 | Aspheric | 3.5848 | 2.4477 | | | 1.4180 |
| S17 | Spherical | Infinite | 0.2100 | 1.518 | 64.17 | |
| S18 | Spherical | Infinite | 0.3900 | | | |
| S19 | Spherical | Infinite | | | | |

Table 8 shows parameters of the zoom lens assembly of Example 3. The units of an effective focal length f, a numerical aperture Fno, a distance T1 between the first lens group G1 and the second lens group G2, a distance T2 between the second lens group G2 and the third lens group G3 and a distance T3 between the third lens group G3 and the fourth lens group G4 are all millimeters (mm), and a unit of a maximum field of view of the zoom lens assembly is degree.

TABLE 8

| | f | FOV | Fno | T1 | T2 | T3 |
|---|---|---|---|---|---|---|
| Wide end | 13.87 | 18.47 | 23.09 | 9.5938 | 1.1878 | 5.5585 |
| Middle end | 35.5 | 26.5 | 21.3 | 4.2610 | 10.0033 | 2.0758 |
| Tele end | 2.90 | 3.37 | 3.80 | 0.6817 | 14.1903 | 1.4681 |

Table 9 shows high-order coefficients applied to each aspheric mirror surface in Example 3. A surface type of each aspheric surface may be defined by formula (1) given in Example 1.

TABLE 9

| Surface number | A4 | A6 | A8 | A10 | A12 | A14 | A16 | A18 | A20 |
|---|---|---|---|---|---|---|---|---|---|
| S1 | −5.4826E−02 | 2.4707E−03 | 4.0633E−04 | 3.2453E−04 | 1.9912E−04 | −1.0748E−04 | 6.1597E−05 | −4.4848E−05 | 2.6983E−05 |
| S2 | −5.1077E−02 | 2.0617E−03 | 3.8038E−04 | −2.8423E−04 | 1.7214E−04 | 8.9973E−05 | 5.0814E−05 | −3.7596E−05 | 2.0685E−05 |
| S3 | 5.2227E−02 | −2.5737E−02 | −8.3419E−04 | −1.7991E−04 | 2.8169E−05 | −1.6342E−05 | 7.0549E−07 | −6.8642E−06 | −5.4136E−06 |
| S4 | −5.6055E−02 | −9.0852E−02 | −1.5744E−02 | −5.7124E−03 | −2.2356E−03 | −1.6756E−03 | −7.7202E−04 | −4.6238E−04 | −1.4347E−04 |
| S5 | −3.4640E−01 | −4.1834E−02 | −3.4319E−03 | −1.1119E−03 | −6.2525E−04 | −1.5197E−03 | −9.4553E−04 | −6.4498E−04 | −2.0611E−04 |
| S6 | −4.9579E−01 | 1.3968E−02 | −1.1276E−02 | −3.8118E−03 | 2.9483E−03 | −2.1496E−03 | −1.1753E−03 | −5.1829E−04 | −1.9126E−04 |
| S7 | −7.2967E−02 | 5.8746E−03 | −4.5740E−03 | −1.1141E−03 | 5.8029E−04 | −1.3796E−03 | −1.4814E−04 | −4.5662E−05 | −1.8209E−05 |
| S8 | 1.6311E−01 | −1.2790E−02 | 2.0035E−03 | −3.7086E−03 | −7.4998E−05 | −3.8671E−05 | 5.0270E−06 | 3.3512E−06 | 4.0888E−06 |
| S9 | 1.1171E−02 | 2.6001E−02 | −2.1270E−03 | 3.8608E−04 | −6.7554E−04 | 2.5438E−04 | 1.9969E−04 | −4.9590E−05 | −3.4196E−05 |
| S10 | 2.2444E−01 | 3.9959E−02 | −7.4923E−03 | 4.7064E−03 | −8.7197E−04 | 2.3659E−04 | 2.8320E−04 | 2.3004E−04 | −1.8378E−04 |
| S11 | 8.8452E−02 | 7.0963E−02 | −4.2119E−03 | 8.3979E−03 | 2.4840E−03 | −3.1087E−04 | −2.8187E−05 | 3.4106E−04 | −1.7205E−04 |
| S12 | −3.9575E−02 | 2.5429E−02 | 4.0857E−03 | 2.8515E−03 | 2.7278E−03 | 1.0113E−03 | 4.9536E−05 | 1.4954E−04 | 2.1228E−05 |
| S13 | 2.2553E+00 | −1.6991E−01 | 8.9572E−03 | −1.5857E−02 | 1.9479E−03 | −3.2830E−03 | −6.0620E−04 | −1.9075E−04 | −4.4905E−04 |
| S14 | 1.3236E+00 | −1.7258E−02 | −8.1886E−02 | −8.5315E−03 | 3.9750E−03 | −1.9665E−03 | −4.1820E−04 | 4.2036E−04 | −1.8560E−04 |
| S15 | −9.6703E−01 | 2.6030E−01 | −1.0214E−01 | −3.8177E−03 | −9.2380E−04 | 4.1995E−03 | 5.8851E−04 | −1.0473E−03 | 2.9839E−06 |
| S16 | −1.2751E+00 | 1.2214E−01 | −1.1771E−01 | −2.6224E−03 | 1.1994E−03 | −4.4091E−04 | 7.5283E−04 | −1.1638E−03 | 1.2581E−04 |

| Surface number | A22 | A24 | A26 | A28 | A30 |
|---|---|---|---|---|---|
| S1 | −1.5474E−05 | 1.4614E−05 | −6.3024E−06 | 4.9932E−06 | −4.4589E−06 |
| S2 | −1.2823E−05 | 1.1201E−05 | −4.4763E−06 | 3.9448E−06 | −2.7191E−06 |
| S3 | 5.8250E−07 | 1.6370E−06 | −3.2052E−06 | −4.5704E−07 | 5.9831E−08 |
| S4 | −4.8663E−05 | −1.7382E−05 | −2.5081E−05 | 1.8738E−05 | 4.0187E−06 |
| S5 | −8.2316E−05 | −3.4780E−05 | −3.5087E−05 | 2.2556E−05 | 2.3475E−06 |

TABLE 9-continued

| | | | | | |
|---|---|---|---|---|---|
| S6 | −8.6068E−05 | −2.8560E−05 | −7.0850E−06 | 3.3508E−06 | −3.0086E−06 |
| S7 | −2.3835E−05 | −1.0565E−05 | −4.1150E−06 | −3.1333E−07 | −4.8867E−07 |
| S8 | −2.1396E−06 | 4.3526E−07 | −5.0827E−08 | −3.4092E−08 | 3.8829E−07 |
| S9 | −1.1449E−05 | −8.3446E−06 | −7.9167E−06 | 1.5619E−05 | −7.0355E−06 |
| S10 | 1.7419E−05 | 3.3228E−05 | −4.6172E−05 | 3.1627E−05 | 1.4455E−05 |
| S11 | 1.4001E−06 | 1.1828E−04 | −1.8032E−05 | 3.1524E−06 | 1.5721E−05 |
| S12 | −9.6654E−06 | 3.3931E−05 | 3.8464E−05 | 1.7272E−05 | 1.1620E−05 |
| S13 | 5.4365E−05 | −1.2076E−04 | 3.2273E−05 | −2.0689E−05 | −1.4595E−05 |
| S14 | 7.1730E−05 | −3.1434E−06 | 4.2336E−05 | 2.2311E−05 | −9.4903E−06 |
| S15 | −2.4007E−04 | −2.4879E−04 | −1.2172E−04 | −1.0530E−04 | −2.1168E−05 |
| S16 | −1.9458E−04 | −1.8661E−05 | −1.1527E−05 | −1.1682E−05 | 5.2788E−06 |

Figure 34:
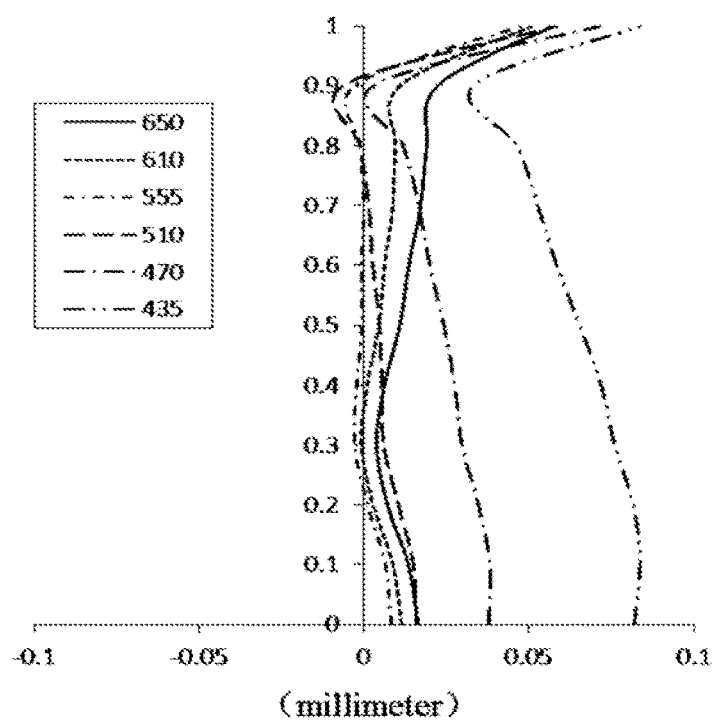
FIGS. 34-37 show a longitudinal aberration curve, an astigmatism curve, a distortion curve and a lateral color curve of the zoom lens assembly in FIG. 31 respectively.
Figure 35:
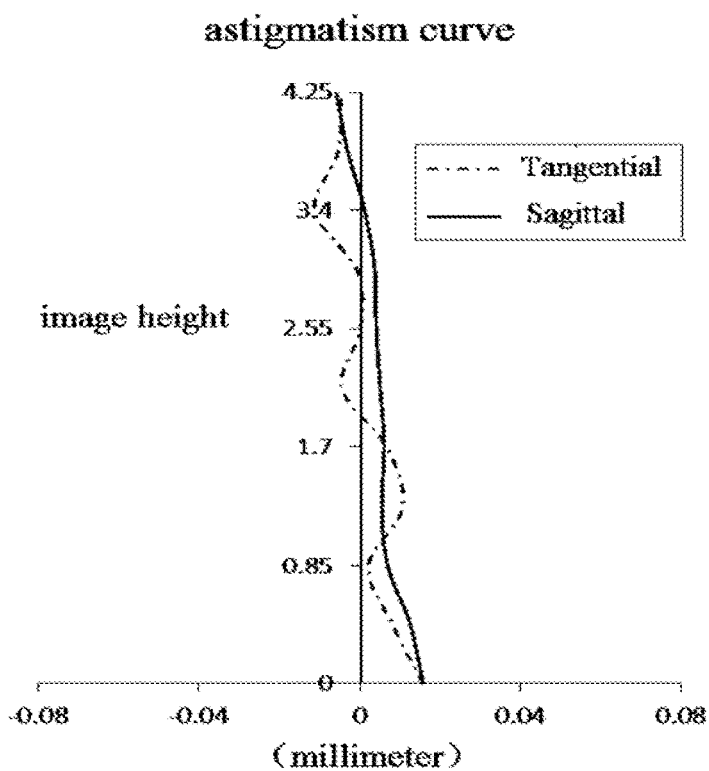
Figure 36:
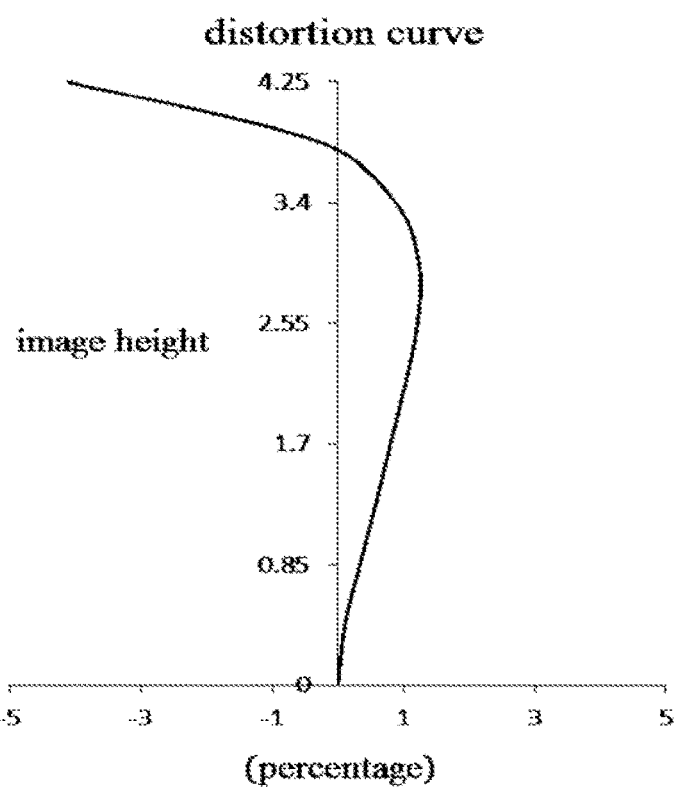
Figure 37:
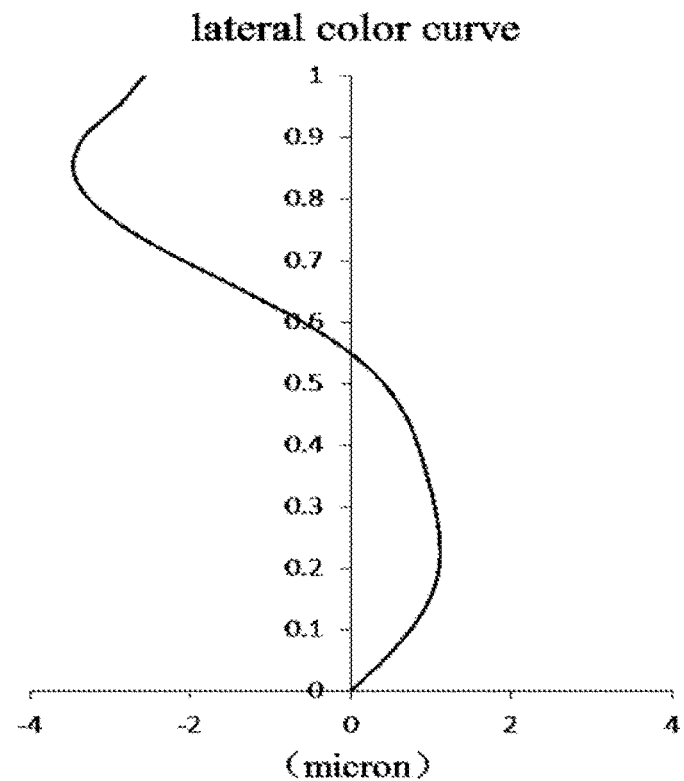

FIG. 34 shows a longitudinal aberration curve of the wide end of the zoom lens assembly according to Example 3 to represent deviation of a convergence focal point after light of different wavelengths passes through the lens. FIG. 35 shows an astigmatism curve of the wide end of the zoom lens assembly according to Example 3 to represent a tangential image surface curvature and a sagittal image surface curvature. FIG. 36 shows a distortion curve of the wide end of the zoom lens assembly according to Example 3 to represent distortion values corresponding to different fields of view. FIG. 37 shows a lateral color curve of the wide end of the zoom lens assembly according to Example 3 to represent deviation of different image heights on the imaging surface after the light passes through the lens.

Figure 38:
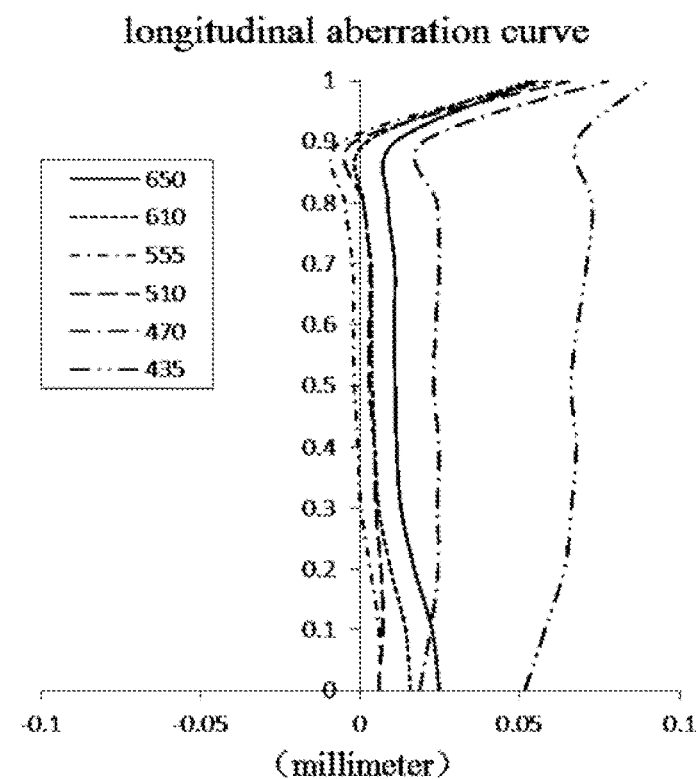
FIGS. 38-41 show a longitudinal aberration curve, an astigmatism curve, a distortion curve and a lateral color curve of the zoom lens assembly in FIG. 32 respectively.
Figure 39:
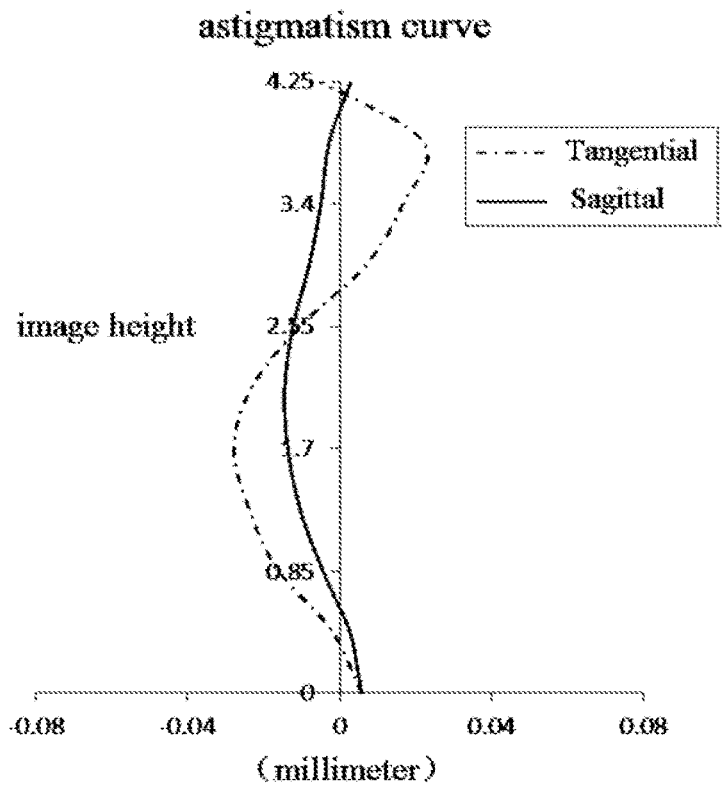
Figure 40:
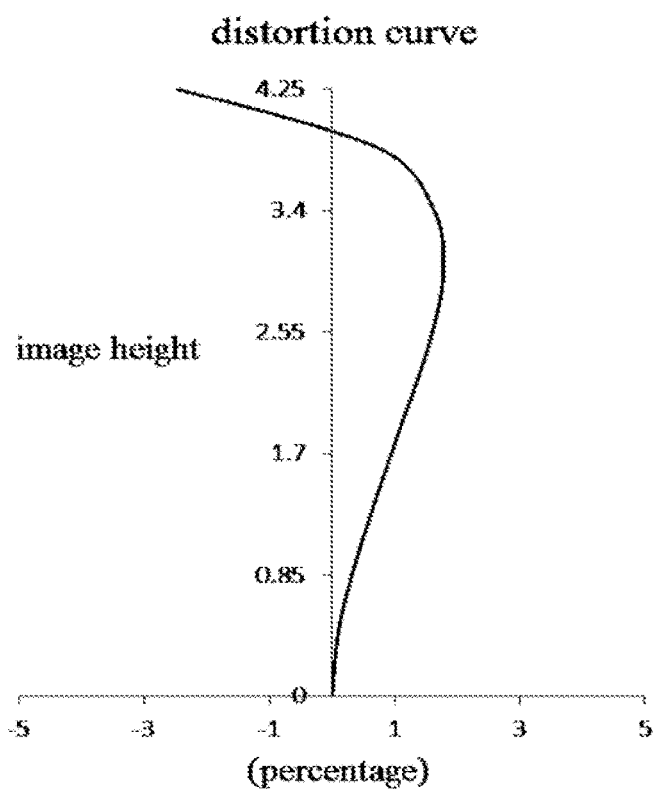
Figure 41:
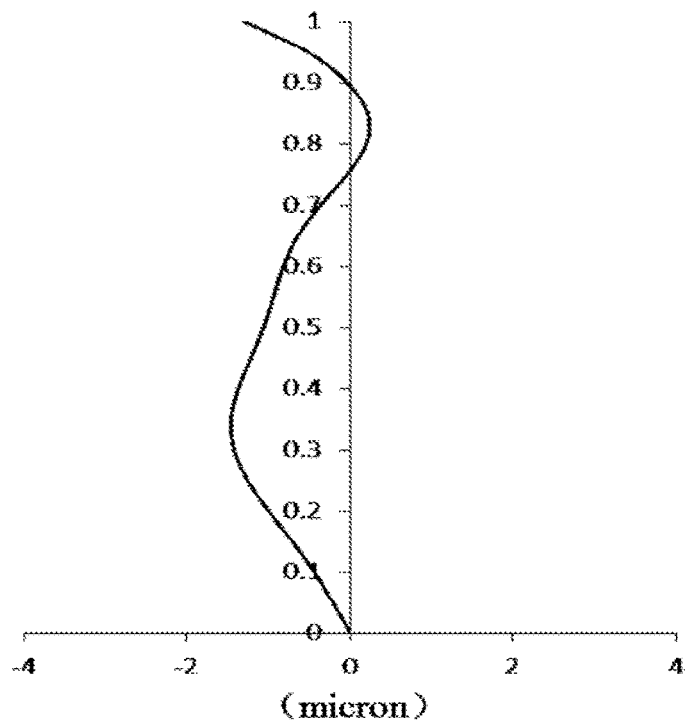

FIG. 38 shows a longitudinal aberration curve of the middle end of the zoom lens assembly according to Example 3 to represent deviation of a convergence focal point after light of different wavelengths passes through the lens. FIG. 39 shows an astigmatism curve of the middle end of the zoom lens assembly according to Example 3 to represent a tangential image surface curvature and a sagittal image surface curvature. FIG. 40 shows a distortion curve of the middle end of the zoom lens assembly according to Example 3 to represent distortion values corresponding to different fields of view. FIG. 41 shows a lateral color curve of the middle end of the zoom lens assembly according to Example 3 to represent deviation of different image heights on the imaging surface after the light passes through the lens.

Figure 42:
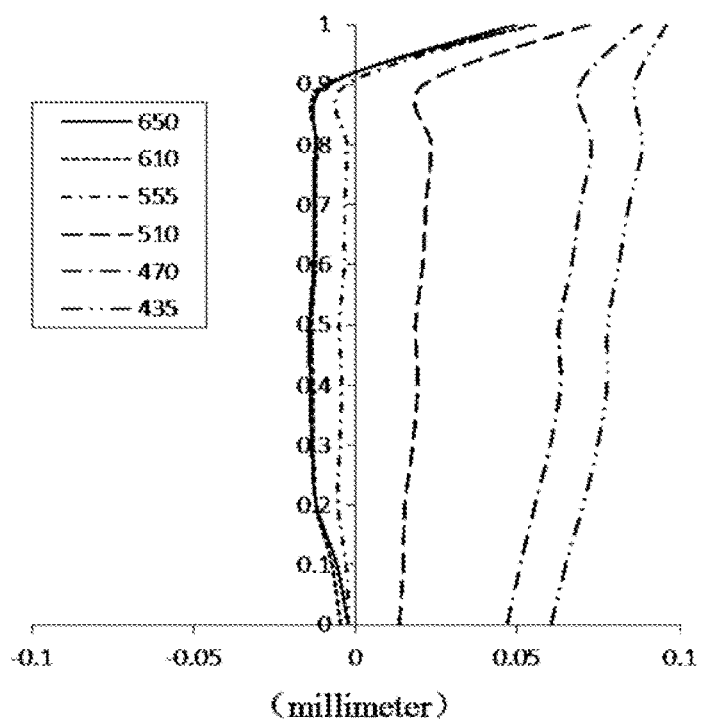
FIGS. 42-45 show a longitudinal aberration curve, an astigmatism curve, a distortion curve and a lateral color curve of the zoom lens assembly in FIG. 33 respectively.
Figure 43:
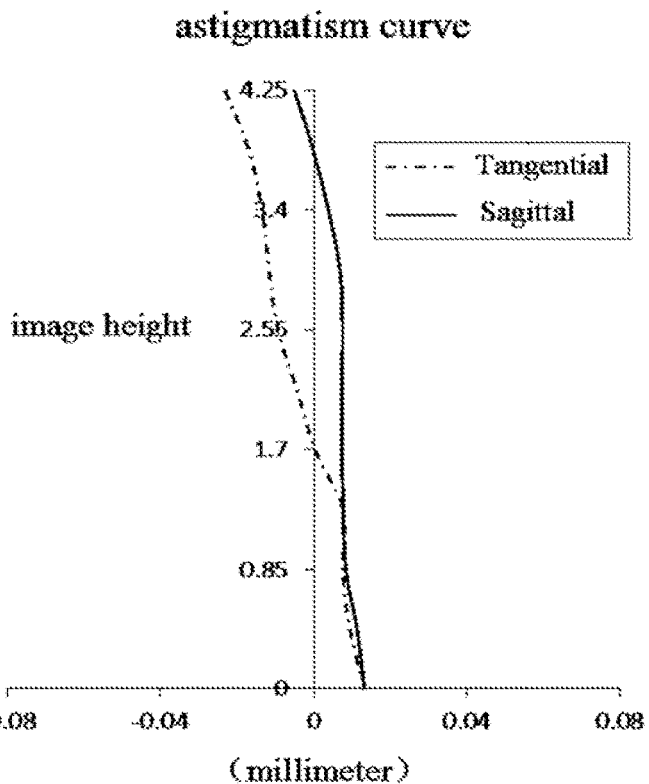
Figure 44:
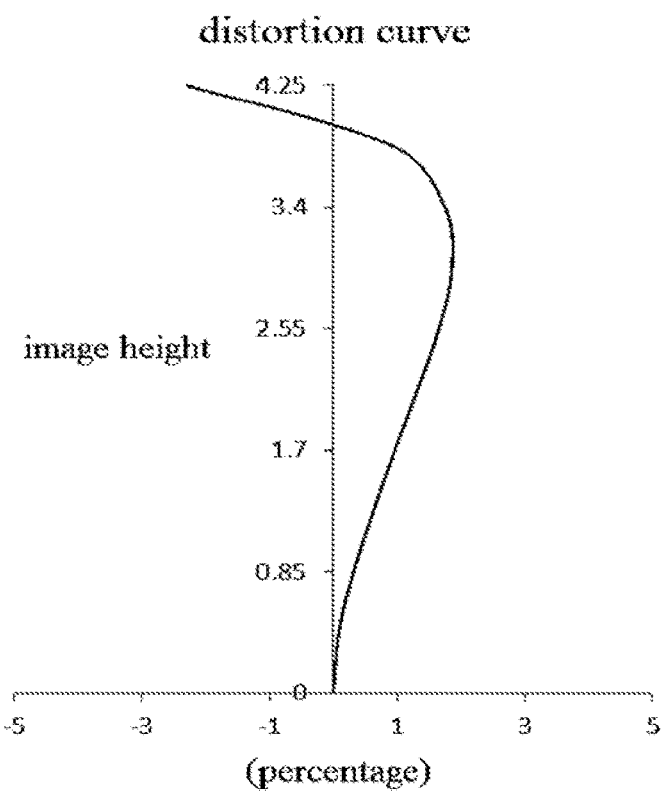
Figure 45:
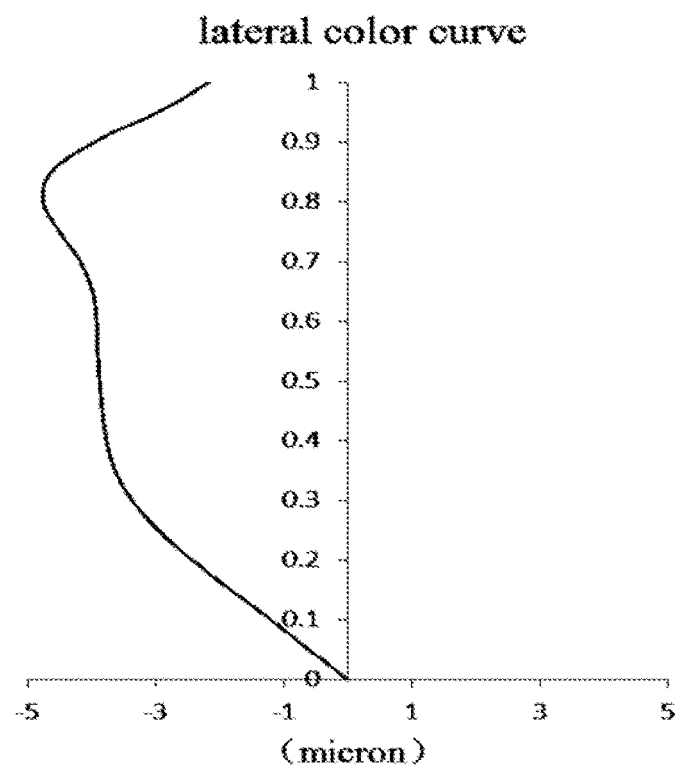

FIG. 42 shows a longitudinal aberration curve of the tele end of the zoom lens assembly according to Example 3 to represent deviation of a convergence focal point after light of different wavelengths passes through the lens. FIG. 43 shows an astigmatism curve of the tele end of the zoom lens assembly according to Example 3 to represent a tangential image surface curvature and a sagittal image surface curvature. FIG. 44 shows a distortion curve of the tele end of the zoom lens assembly according to Example 3 to represent distortion values corresponding to different fields of view. FIG. 45 shows a lateral color curve of the tele end of the zoom lens assembly according to Example 3 to represent deviation of different image heights on the imaging surface after the light passes through the lens.

According to FIGS. 34-45, it can be seen that the zoom lens assembly provided in Example 3 may achieve high imaging quality.

Example 4

Figure 46:
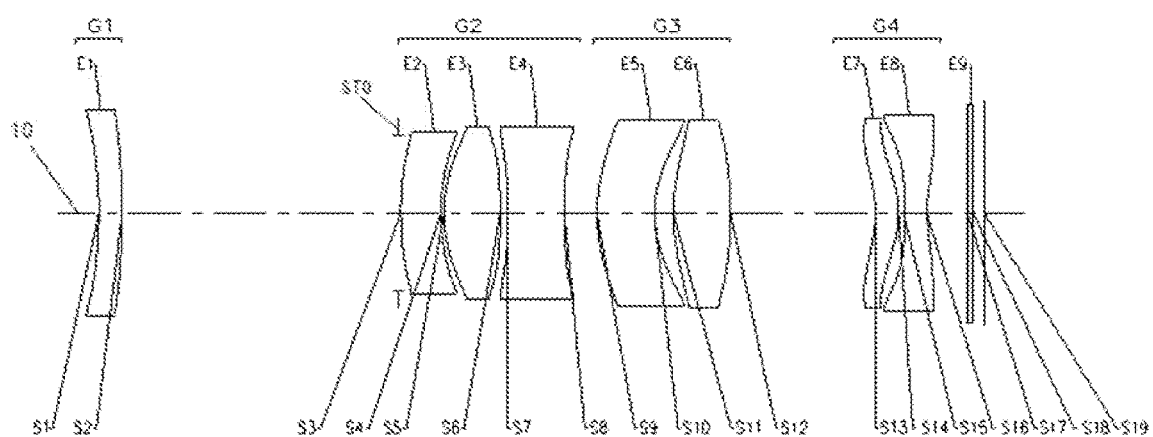
FIG. 46 shows a structural schematic diagram of a wide end of a zoom lens assembly according to Example 4 of the disclosure.
Figure 47:
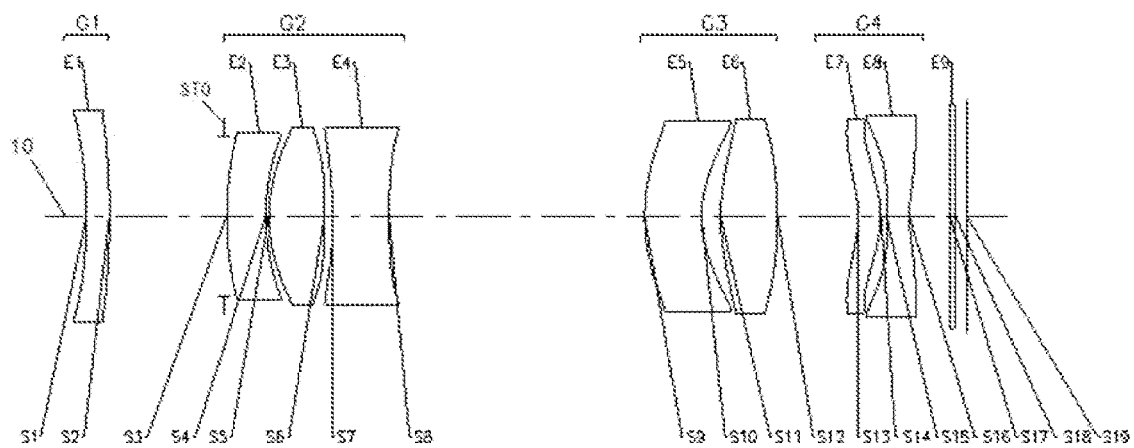
FIG. 47 shows a structural schematic diagram of a middle end of a zoom lens assembly according to Example 4 of the disclosure.
Figure 48:
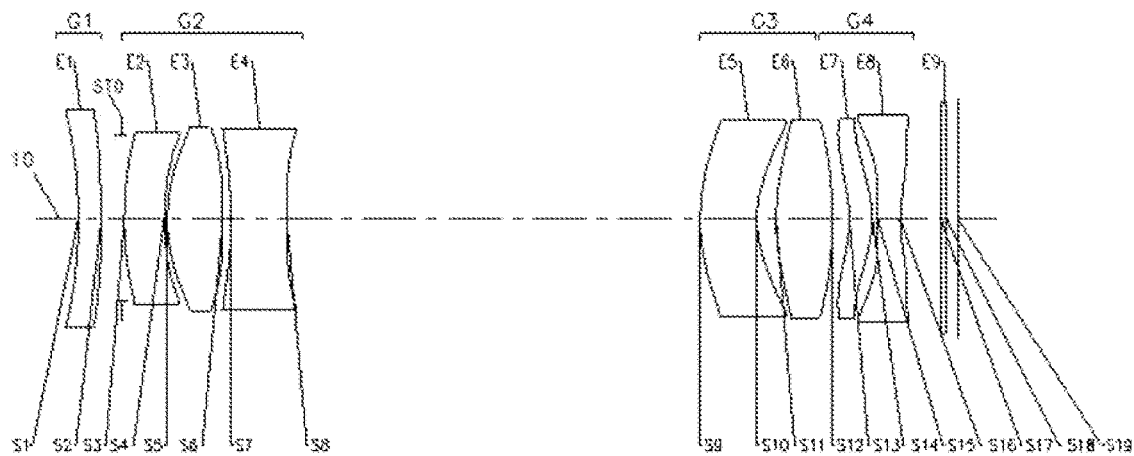
FIG. 48 shows a structural schematic diagram of a tele end of a zoom lens assembly according to Example 4 of the disclosure.

As shown in FIGS. 46-60, a zoom lens assembly according to Example 4 of the disclosure is described. In the embodiment and the following embodiments, parts of descriptions similar to those about Example 1 are omitted for simplicity. FIG. 46 shows a structural schematic diagram of a wide end of a zoom lens assembly according to Example 4. FIG. 47 shows a structural schematic diagram of a middle end of a zoom lens assembly according to Example 4. FIG. 48 shows a structural schematic diagram of a tele end of a zoom lens assembly according to Example 4.

As shown in FIGS. 46-48, the zoom lens assembly sequentially includes from an object side to an image side: a first lens group G1, a diaphragm STO, a second lens group G2, a third lens group G3, a fourth lens group G4, an optical filter E9 and an imaging surface S19. The first lens group G1 includes a first lens E1. The second lens group G2 includes a second lens E2, a third lens E3 and a fourth lens E4. The third lens group G3 includes a fifth lens E5 and a sixth lens E6. The fourth lens group G4 includes a seventh lens E7 and an eighth lens E8.

The first lens E1 has a positive refractive power or a negative refractive power, an object-side surface S1 of the first lens is a concave surface, and an image-side surface S2 of the first lens is a convex surface. The second lens E2 has a positive refractive power or a negative refractive power, an object-side surface S3 of the second lens is a convex surface, and an image-side surface S4 of the second lens is a concave surface. The third lens E3 has a positive refractive power or a negative refractive power, an object-side surface S5 of the third lens is a convex surface, and an image-side surface S6 of the third lens is a convex surface. The fourth lens E4 has a positive refractive power or a negative refractive power, an object-side surface S7 of the fourth lens is a concave surface, and an image-side surface S8 of the fourth lens is a concave surface. The fifth lens E5 has a positive refractive power or a negative refractive power, an object-side surface S9 of the fifth lens is a convex surface, and an image-side surface S10 of the fifth lens is a concave surface. The sixth lens E6 has a positive refractive power or a negative refractive power, an object-side surface S11 of the sixth lens is a convex surface, and an image-side surface S12 of the sixth lens is a convex surface. The seventh lens E7 has a positive refractive power or a negative refractive power, an object-side surface S13 of the seventh lens is a concave surface, and an image-side surface S14 of the seventh lens is a convex surface. The eighth lens E8 has a positive refractive power or a negative refractive power, an object-side surface S15 of the eighth lens is a convex surface, and an image-side surface S16 of the eighth lens is a concave surface. The optical filter E9 has an object-side surface S17 of the optical filter and an image-side surface S18 of the optical filter. Light from an object sequentially penetrates through each of the surfaces S1 to S18 and is finally imaged on the imaging surface S19. At least one of the second lens E2, the third lens E3 and the fourth lens E4 has a positive refractive power. At least one of the seventh lens E7 and the eighth lens E8 has a positive refractive power.

Table 10 shows a basic structural parameter table of the zoom lens assembly of Example 4, wherein the units of the curvature radius, the thickness/distance, and the focal length are all millimeters (mm).

| Surface number | Surface type | Curvature radius | Thick-ness | Material Refractive index | Abbe number | Conic co-efficient |
|---|---|---|---|---|---|---|
| OBJ | Spherical | Infinite | Infinite | | | |
| S1 | Aspheric | −18.5014 | 0.8040 | 1.546 | 56.13 | −4.6409 |
| S2 | Aspheric | −34.1845 | T1 | | | 10.0000 |
| STO | Spherical | Infinite | 0.1000 | | | |
| S3 | Aspheric | 14.2275 | 1.4003 | 1.677 | 19.24 | 6.3998 |
| S4 | Aspheric | 9.8025 | 0.1000 | | | 6.0040 |
| S5 | Aspheric | 5.7387 | 1.9607 | 1.546 | 56.13 | 0.5393 |
| S6 | Aspheric | −53.7732 | 0.2784 | | | −10.0000 |
| S7 | Aspheric | −21.5586 | 1.9838 | 1.546 | 56.13 | −6.7562 |
| S8 | Aspheric | 35.8139 | T2 | | | 5.2012 |
| S9 | Aspheric | 6.7850 | 2.0000 | 1.677 | 19.24 | −2.3455 |
| S10 | Aspheric | 4.1583 | 0.6675 | | | −3.0248 |
| S11 | Aspheric | 7.7091 | 2.0000 | 1.546 | 56.13 | −5.9489 |
| S12 | Aspheric | −17.3492 | T3 | | | 9.8008 |
| S13 | Aspheric | −4.4726 | 0.8000 | 1.653 | 23.52 | −0.2376 |
| S14 | Aspheric | −3.8273 | 0.1838 | | | −5.6838 |
| S15 | Aspheric | 18.8047 | 0.8000 | 1.546 | 56.13 | −5.1839 |
| S16 | Aspheric | 4.5435 | 1.4197 | | | −3.9775 |
| S17 | Spherical | Infinite | 0.2100 | 1.518 | 64.17 | |
| S18 | Spherical | Infinite | 0.3900 | | | |
| S19 | Spherical | Infinite | | | | |

Table 10

Table 11 shows parameters of the zoom lens assembly of Example 4. The units of an effective focal length f, a numerical aperture Fno, a distance T1 between the first lens group G1 and the second lens group G2, a distance T2 between the second lens group G2 and the third lens group G3 and a distance T3 between the third lens group 3 and the fourth lens group G4 are all millimeter (mm), and a unit of a maximum field of view of the zoom lens assembly is degree.

TABLE 11

| | f | FOV | Fno | T1 | T2 | T3 |
|---|---|---|---|---|---|---|
| Wide end | 13.87 | 18.47 | 23.09 | 9.5938 | 1.1878 | 5.5585 |
| Middle end | 34.9 | 26.1 | 20.9 | 4.2610 | 10.0033 | 2.0758 |
| Tele end | 2.75 | 3.42 | 4.09 | 0.6817 | 14.1903 | 1.4681 |

Table 12 shows high-order coefficients applied to each aspheric mirror surface in Example 4. A surface type of each aspheric surface may be defined by formula (1) given in Example 1.

Figure 49:
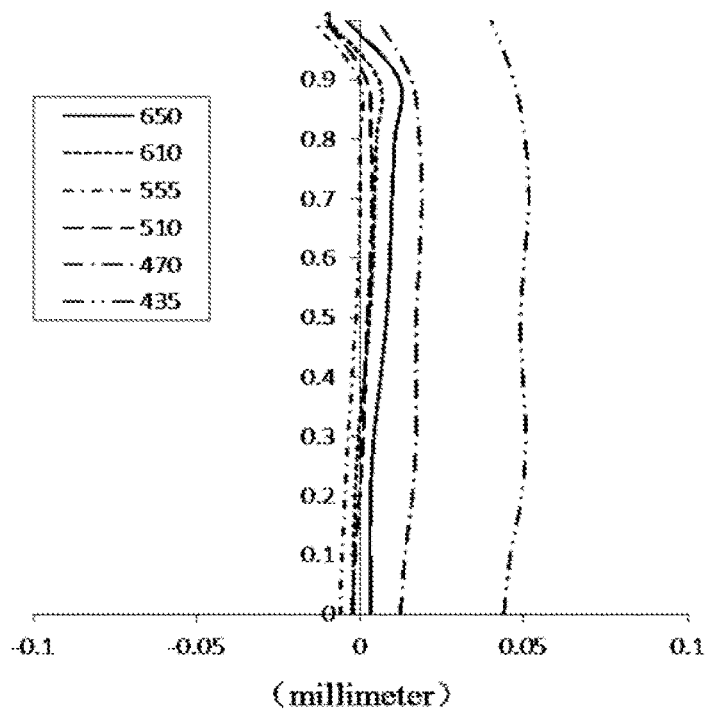
FIGS. 49-52 show a longitudinal aberration curve, an astigmatism curve, a distortion curve and a lateral color curve of the zoom lens assembly in FIG. 46 respectively.
Figure 50:
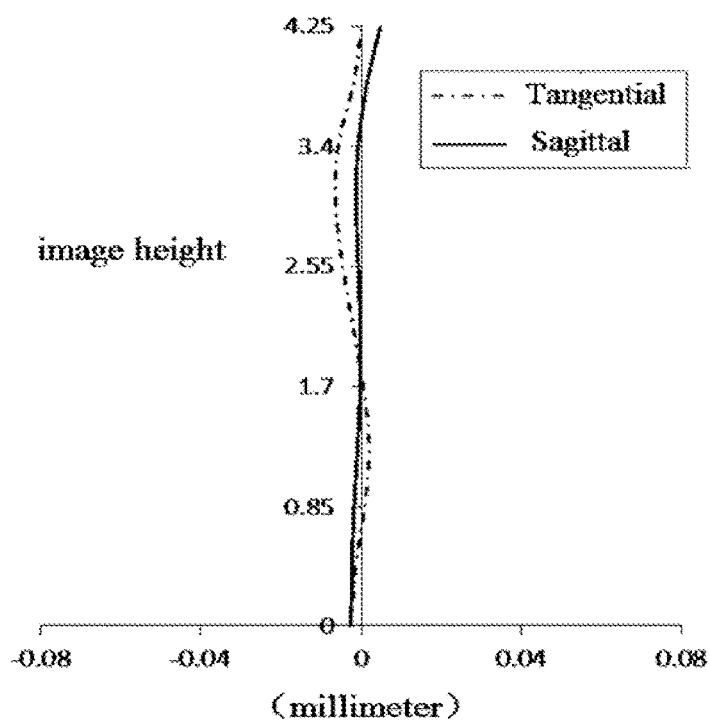
Figure 51:
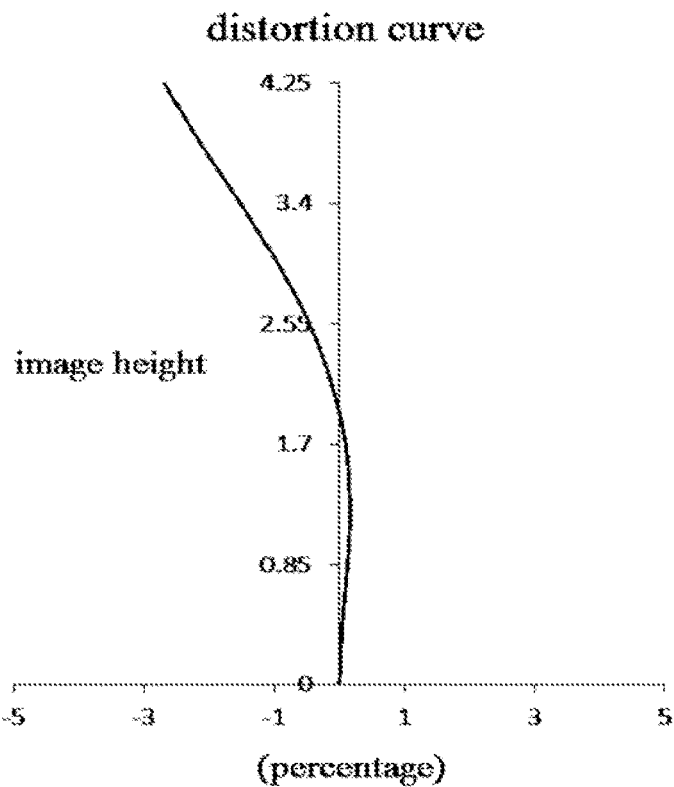
Figure 52:
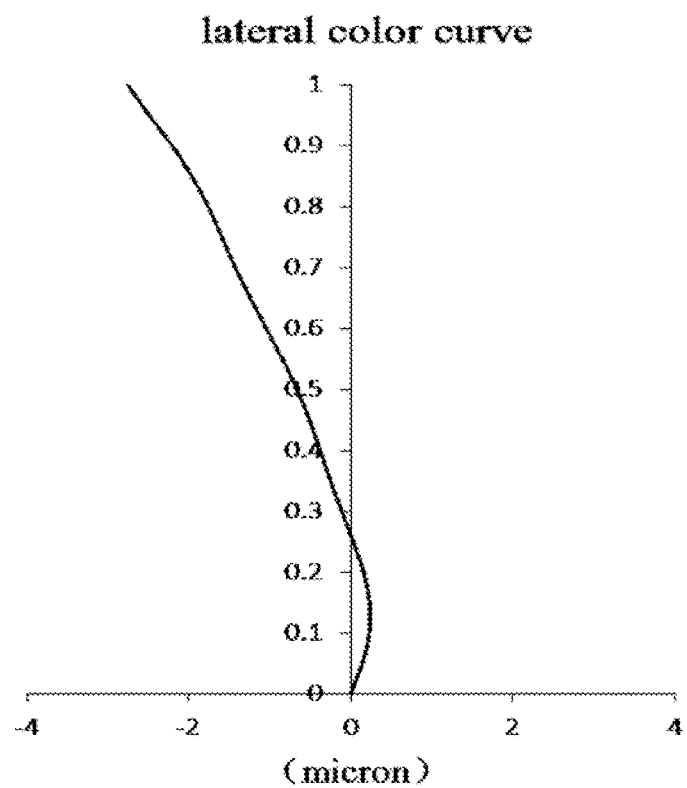

FIG. 49 shows a longitudinal aberration curve of the wide end of the zoom lens assembly according to Example 4 to represent deviation of a convergence focal point after light of different wavelengths passes through the lens. FIG. 50 shows an astigmatism curve of the wide end of the zoom lens assembly according to Example 4 to represent a tangential image surface curvature and a sagittal image surface curvature. FIG. 51 shows a distortion curve of the wide end of the zoom lens assembly according to Example 4 to represent distortion values corresponding to different fields of view. FIG. 52 shows a lateral color curve of the wide end of the zoom lens assembly according to Example 4 to represent deviation of different image heights on the imaging surface after the light passes through the lens.

Figure 53:
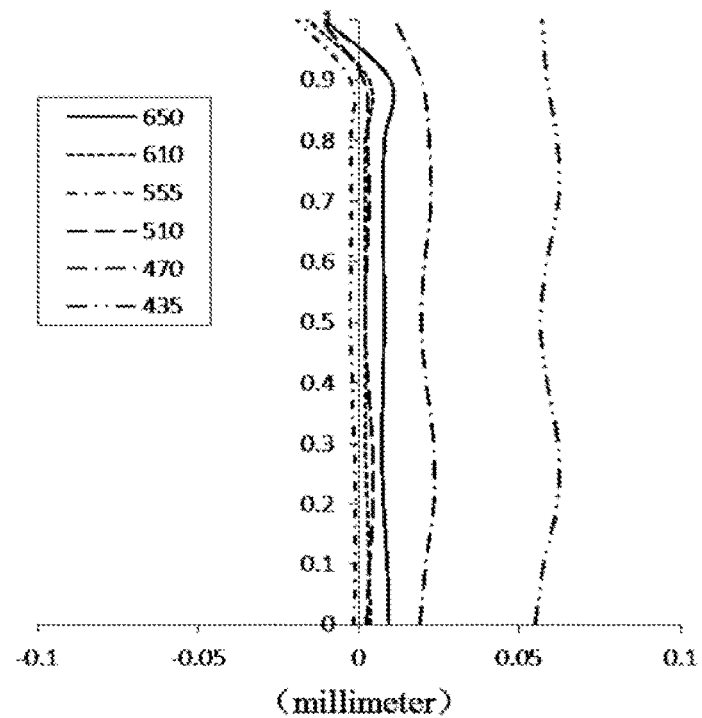
FIGS. 53-56 show a longitudinal aberration curve, an astigmatism curve, a distortion curve and a lateral color curve of the zoom lens assembly in FIG. 47 respectively.
Figure 54:
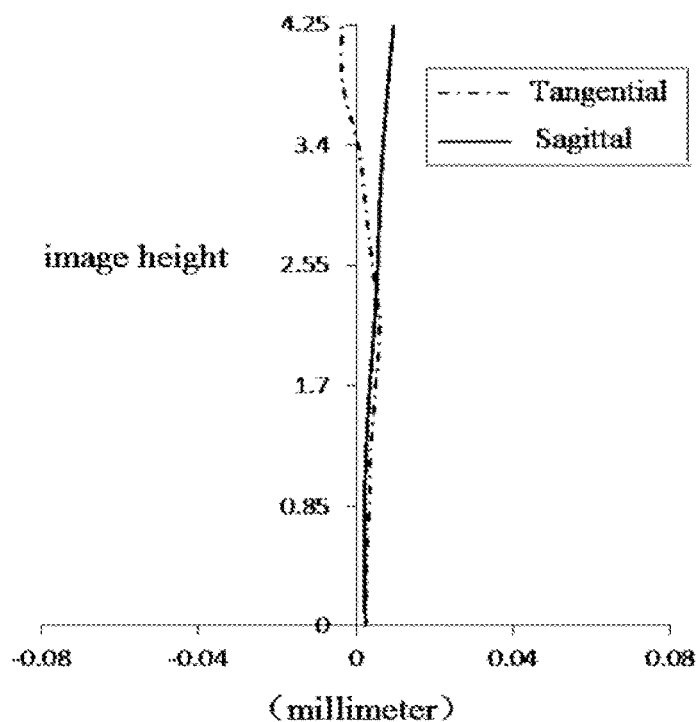
Figure 55:
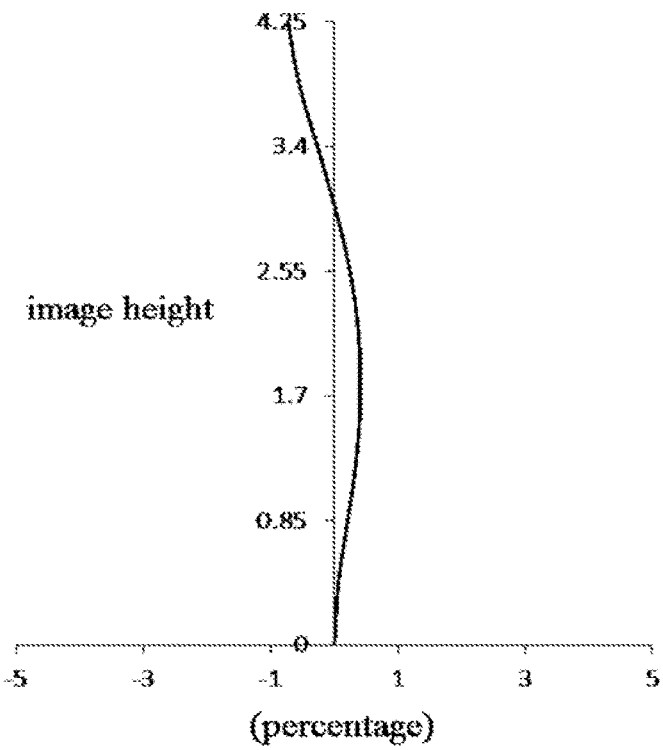
Figure 56:
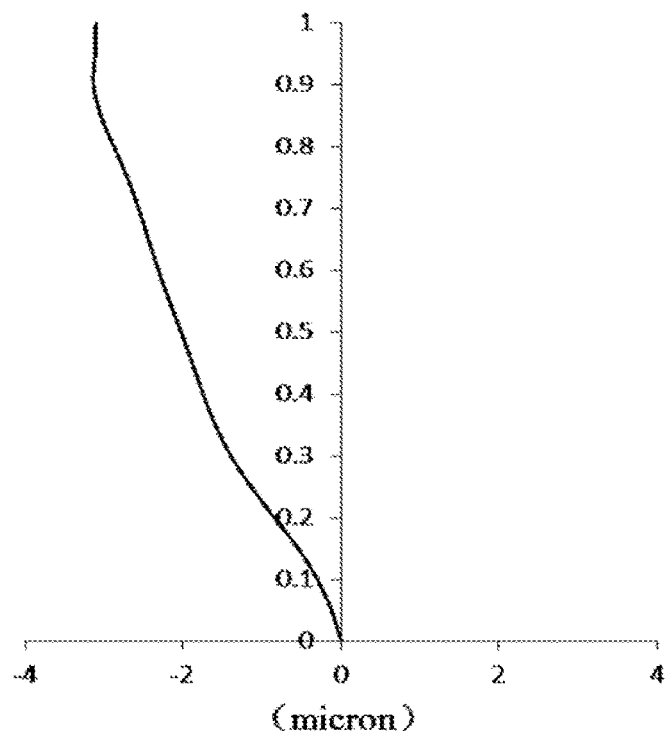

FIG. 53 shows a longitudinal aberration curve of the middle end of the zoom lens assembly according to Example 4 to represent deviation of a convergence focal point after light of different wavelengths passes through the lens. FIG. 54 shows an astigmatism curve of the middle end of the zoom lens assembly according to Example 4 to represent a tangential image surface curvature and a sagittal image surface curvature. FIG. 55 shows a distortion curve of the middle end of the zoom lens assembly according to Example 4 to represent distortion values corresponding to different fields of view. FIG. 56 shows a lateral color curve of the middle end of the zoom lens assembly according to Example 4 to represent deviation of different image heights on the imaging surface after the light passes through the lens.

Figure 57:
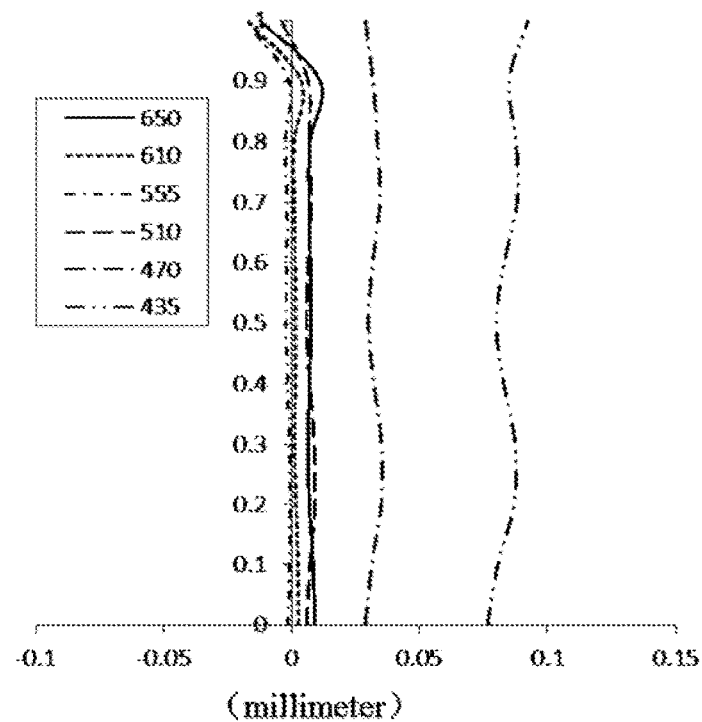
FIGS. 57-60 show a longitudinal aberration curve, an astigmatism curve, a distortion curve and a lateral color curve of the zoom lens assembly in FIG. 48 respectively.
Figure 58:
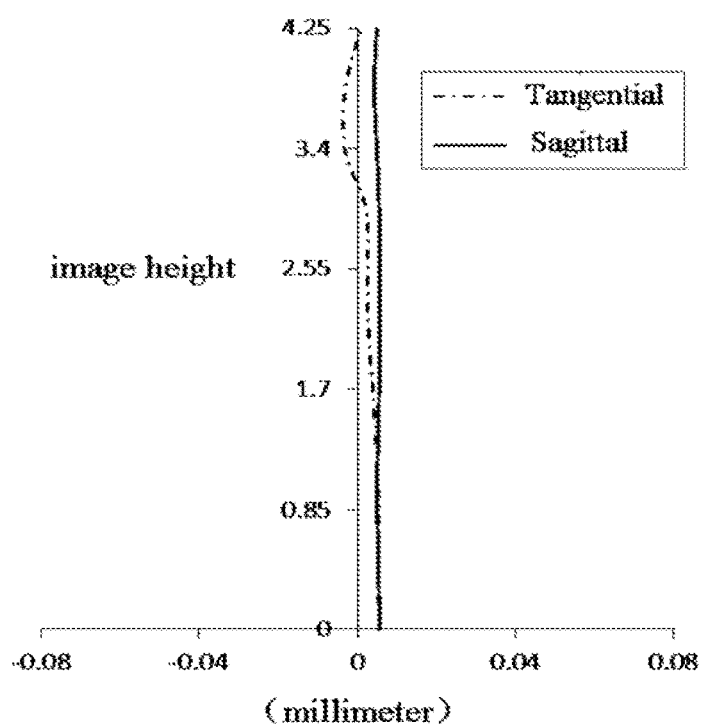
Figure 59:
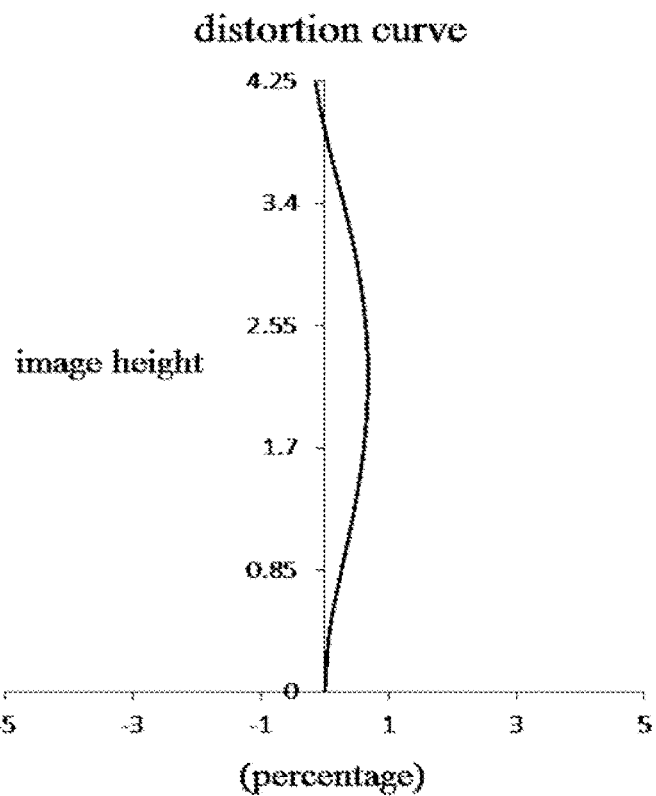

FIG. 57 shows a longitudinal aberration curve of the tele end of the zoom lens assembly according to Example 4 to represent deviation of a convergence focal point after light of different wavelengths passes through the lens. FIG. 58 shows an astigmatism curve of the tele end of the zoom lens assembly according to Example 4 to represent a tangential image surface curvature and a sagittal image surface curvature. FIG. 59 shows a distortion curve of the tele end of the zoom lens assembly according to Example 4 to represent distortion values corresponding to different fields of view. FIG. 60 shows a lateral color curve of the tele end of the zoom lens assembly according to Example 4 to represent deviation of different image heights on the imaging surface after the light passes through the lens.

According to FIGS. 49-60, it can be seen that the zoom lens assembly provided in Example 4 may achieve high imaging quality.

TABLE 12

| Surface number | A4 | A6 | A8 | A10 | A12 | A14 | A16 | A18 | A20 |
|---|---|---|---|---|---|---|---|---|---|
| S1 | −6.9753E−02 | 3.1394E−03 | 2.2535E−04 | 8.1774E−05 | −4.2517E−05 | −6.6469E−06 | 3.8136E−06 | 4.0982E−06 | −5.2371E−07 |
| S2 | −3.4728E−02 | 2.4798E−03 | 2.4405E−04 | 7.2140E−05 | −3.8776E−05 | −6.0928E−06 | 4.2806E−06 | 3.4895E−06 | −6.3460E−07 |
| S3 | 3.8960E−02 | −7.8531E−03 | 1.0313E−04 | −7.6305E−05 | 3.1084E−05 | −1.3629E−05 | 5.1895E−06 | −6.2676E−07 | 9.4580E−07 |
| S4 | −5.2773E−03 | −2.4319E−02 | −1.1799E−03 | −1.8291E−04 | 1.8773E−04 | 2.6444E−04 | 1.8671E−05 | −4.0873E−05 | 6.3176E−06 |
| S5 | −2.0288E−01 | −1.6351E−02 | −1.5782E−04 | 6.3004E−04 | −9.3131E−05 | −7.8810E−04 | −2.2449E−04 | −1.3943E−04 | 1.9570E−06 |
| S6 | −3.5445E−01 | 3.5230E−02 | −1.6516E−03 | −4.4482E−04 | −1.9988E−03 | −1.3560E−03 | −5.1535E−04 | −7.5475E−05 | −1.0227E−05 |
| S7 | −7.2934E−02 | 2.9812E−02 | −1.0121E−03 | −5.8821E−04 | −1.3537E−03 | −6.0127E−04 | −8.7047E−05 | 8.0042E−05 | 2.2084E−05 |
| S8 | 2.0228E−02 | −4.5236E−03 | −7.3777E−04 | 1.4221E−05 | −9.2713E−06 | 5.5814E−05 | 5.2546E−05 | 3.3003E−05 | 9.9649E−06 |
| S9 | −2.4322E−01 | −5.5770E−03 | −2.1997E−03 | 1.1595E−03 | 3.9203E−04 | 2.1685E−04 | 5.1846E−05 | 2.8191E−05 | 2.5989E−05 |
| S10 | −1.2546E−01 | −2.2511E−02 | 2.7072E−03 | 3.2968E−03 | 1.4962E−03 | 1.0121E−03 | 2.6616E−04 | 1.3696E−05 | 3.8182E−05 |
| S11 | −1.0975E−01 | 1.0144E−01 | 3.0748E−02 | 9.2726E−03 | 2.2433E−03 | 1.3282E−03 | 3.6197E−04 | −1.4401E−04 | −5.4503E−05 |
| S12 | 3.2086E−02 | 9.3096E−02 | 3.0649E−02 | 8.6210E−03 | 2.1336E−03 | 7.7177E−04 | 3.6564E−04 | 1.0644E−04 | 1.9193E−05 |
| S13 | 2.1836E+00 | −1.2401E−01 | 2.4185E−02 | −1.2299E−02 | 7.8154E−04 | −2.3107E−03 | −9.2552E−05 | −5.0285E−04 | 8.0475E−05 |
| S14 | 6.8255E−01 | 2.0923E−02 | −2.2951E−02 | −2.0098E−03 | −1.8737E−03 | −1.7134E−03 | −8.8546E−04 | −1.2476E−03 | −1.5584E−04 |
| S15 | −1.6621E+00 | 4.0575E−01 | −9.2682E−02 | 2.4936E−02 | −4.3613E−03 | −4.5546E−04 | −8.9738E−04 | −1.3155E−03 | 1.7158E−04 |
| S16 | −1.2462E+00 | 3.4537E−01 | −8.2698E−02 | 2.5098E−02 | −6.4944E−03 | 1.8579E−03 | −5.3100E−04 | −1.0425E−04 | −4.7032E−05 |

From the above, Example 1 to Example 4 satisfy a relationship shown in Table 13 respectively.

TABLE 13

| Conditional expression/Embodiment | 1 | 2 | 3 | 4 |
|---|---|---|---|---|
| TTL/|Δf| | 3.04 | 3.04 | 3.52 | 3.36 |
| ft/|fG1| | 0.07 | 0.07 | 0.75 | 0.31 |
| fw/fG2 | 0.54 | 0.55 | 0.89 | 0.67 |
| fw/fG3 | 0.97 | 0.96 | 0.09 | 0.67 |
| fw/|fG4| | 1.31 | 1.23 | 0.29 | 0.79 |
| ft/|ΔT1| | 2.57 | 2.57 | 2.59 | 2.58 |
| ft/|ΔT3| | 5.14 | 5.14 | 5.64 | 5.16 |
| f2/fG2 | −2.05 | −2.17 | −3.74 | −2.55 |
| f5/f6 | −2.94 | −2.89 | −1.34 | −2.26 |
| (R9-R10)/CT5 | 3.47 | 3.35 | 1.32 | 1.31 |
| (R14-R13)/CT7 | 0.73 | 0.82 | 0.46 | 0.81 |
| ft/fw | 1.66 | 1.66 | 1.66 | 1.66 |

The disclosure also provides an imaging device, of which an electronic photosensitive element may be a Charge Coupled Device (CCD) or a Complementary Metal Oxide Semiconductor (CMOS). The imaging device may be an independent imaging device such as a digital camera, or may be an imaging module integrated into a mobile electronic device such as a mobile phone. The imaging device is provided with the abovementioned zoom lens assembly.

It is apparent that the described embodiments are not all but only part of embodiments of the disclosure. All other embodiments obtained by those of ordinary skill in the art based on the embodiments in the disclosure without creative work shall fall within the scope of protection of the disclosure.

It is to be noted that terms used herein are only adopted to describe specific implementation modes and not intended to limit exemplary implementation modes according to the disclosure. For example, singular forms, used herein, are also intended to include plural forms, unless otherwise clearly pointed out. In addition, it is also to be understood that terms "contain" and/or "include" used in the specification refer/refers to existence of features, steps, work, apparatuses, components and/or combinations thereof.

It is to be noted that terms "first", "second" and the like in the specification, claims and drawings of the present disclosure are adopted not to describe a specific sequence or order but to distinguish similar objects. It is to be understood that data used like this may be exchanged under a proper condition for implementation of the implementation modes, described herein, of the present disclosure in sequences besides those shown or described here.

The above is only the preferred embodiment of the disclosure and not intended to limit the disclosure. For those skilled in the art, the disclosure may have various modifications and variations. Any modifications, equivalent replacements, improvements and the like made within the spirit and principle of the disclosure shall fall within the scope of protection of the disclosure.

What is claimed is:

1. A zoom lens assembly, sequentially comprising from an object side to an image side along an optical axis (10):
    a first lens group (G1);
    a second lens group (G2) with a positive refractive power, spaced from the first lens group (G1) by a first air space and movable on the optical axis (10);
    a third lens group (G3) with a positive refractive power, spaced from the second lens group (G2) by a second air space and movable on the optical axis (10); and
    a fourth lens group (G4), spaced from the third lens group (G3) by a third air space,
    wherein a Total Track Length (TTL) of the zoom lens assembly and a difference Δf between an effective focal length of the zoom lens assembly at a wide end and an effective focal length of the zoom lens assembly at a tele end satisfy 2.5<TTL/|Δf|<4.0;
    an effective focal length fw of the zoom lens assembly at the wide end and an effective focal length fG2 of the second lens group satisfy 0.5<fw/fG2<1.0.

2. The zoom lens assembly according to claim 1, further comprising a diaphragm (STO), arranged between the first lens group (G1) and the second lens group (G2) and moving with the second lens group (G2), wherein a numerical aperture Fno of the zoom lens assembly in different zoom states satisfies 2.8<Fno≤5.0.

3. The zoom lens assembly according to claim 1, wherein the first air space, the second air space and the third air space are all greater than 0.5 millimeters.

4. The zoom lens assembly according to claim 1, wherein an effective focal length fw of the zoom lens assembly at the wide end and an effective focal length fG3 of the third lens group satisfy 0<fw/fG3≤1.0.

5. The zoom lens assembly according to claim 1, wherein an effective focal length fw of the zoom lens assembly at the wide end and an effective focal length fG4 of the fourth lens group satisfy fw/|fG4|<1.5.

6. The zoom lens assembly according to claim 1, wherein an effective focal length ft of the zoom lens assembly at the tele end and a zoom movement distance ΔT1 of the second lens group (G2) from the wide end to the tele end on the optical axis (10) satisfy 2.0<ft/|ΔT1|<3.0.

7. The zoom lens assembly according to claim 1, wherein an effective focal length ft of the zoom lens assembly at the tele end and a zoom movement distance ΔT3 of the third lens group (G3) from the wide end to the tele end on the optical axis (10) satisfy 5.0<ft/|ΔT3|<6.0.

8. The zoom lens assembly according to claim 1, wherein the fourth lens group (G4) is movable on the optical axis (10), and moves for focusing with an object distance of the zoom lens assembly, and when the object distance changes from an infinite distance to 1.5 meters, a focusing movement distance ΔT4 of the fourth lens group (G4) on the optical axis (10) satisfies |ΔT4|<1.0 mm.

9. The zoom lens assembly according to claim 1, wherein
    the first lens group (G1) comprises a first lens (E1);
    the second lens group (G2) comprises a second lens (E2), a third lens (E3) and a fourth lens (E4), and at least one of the second lens (E2), the third lens (E3) and the fourth lens (E4) has a positive refractive power;
    the third lens group (G3) comprises a fifth lens (E5) and a sixth lens (E6); and
    the fourth lens group (G4) comprises a seventh lens (E7) and an eighth lens (E8), and at least one of the seventh lens (E7) and the eighth lens (E8) has a positive refractive power.

10. The zoom lens assembly according to claim 9, wherein an effective focal length f2 of the second lens and an effective focal length fG2 of the second lens group satisfy −5.0<f2/fG2≤−2.0.

11. The zoom lens assembly according to claim 9, wherein an effective focal length f5 of the fifth lens and an effective focal length f6 of the sixth lens satisfy −3.0≤f5/f6<−1.0.

12. The zoom lens assembly according to claim 9, wherein a curvature radius R9 of an object-side surface of the fifth lens, a curvature radius R10 of an image-side surface of the fifth lens and a center thickness CT5 of the fifth lens satisfy 1.0<(R9−R10)/CT5<5.0.

13. The zoom lens assembly according to claim 9, wherein a curvature radius R13 of an object-side surface of the seventh lens, a curvature radius R14 of an image-side surface of the seventh lens and a center thickness CT7 of the seventh lens satisfy 0<(R14−R13)/CT7<1.0.

14. A zoom lens assembly, sequentially comprising from an object side to an image side along an optical axis (10):
- a first lens group (G1);
- a second lens group (G2) with a positive refractive power, spaced from the first lens group (G1) by a first air space and movable on the optical axis (10);
- a third lens group (G3) with a positive refractive power, spaced from the second lens group (G2) by a second air space and movable on the optical axis (10); and
- a fourth lens group (G4), spaced from the third lens group (G3) by a third air space,
- wherein an effective focal length fw of the zoom lens assembly at a wide end and an effective focal length ft of the zoom lens assembly at a tele end satisfy 1.5<ft/fw<2.0;
- an effective focal length fw of the zoom lens assembly at the wide end and an effective focal length fG2 of the second lens grow satisfy 0.5<fw/fG2<1.0.

* * * * *